US012288531B2

(12) United States Patent
Jiang et al.

(10) Patent No.: US 12,288,531 B2
(45) Date of Patent: Apr. 29, 2025

(54) SYSTEMS AND METHODS FOR PERFORMING GLOBAL DIMMING IN ARTIFICIAL REALITY SYSTEMS

(71) Applicant: Meta Platforms Technologies, LLC, Menlo Park, CA (US)

(72) Inventors: Haomiao Jiang, Cupertino, CA (US); Linghui Rao, Redmond, WA (US); Tianxin Ning, San Mateo, CA (US); Weihua Gao, Santa Clara, CA (US); Yongmin Park, Sammamish, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/301,629

(22) Filed: Apr. 17, 2023

(65) Prior Publication Data

US 2024/0347013 A1 Oct. 17, 2024

(51) Int. Cl.
*G09G 3/34* (2006.01)
*G09G 3/36* (2006.01)

(52) U.S. Cl.
CPC ......... *G09G 3/3426* (2013.01); *G09G 3/3607* (2013.01); *G09G 2320/0646* (2013.01); *G09G 2320/0666* (2013.01)

(58) Field of Classification Search
CPC ............... G09G 3/3426; G09G 3/3607; G09G 2320/0666
USPC ................................................ 345/8, 87–104
See application file for complete search history.

(56) References Cited

U.S. PATENT DOCUMENTS

| | | | | |
|---|---|---|---|---|
| 8,044,923 | B1 | 10/2011 | Lew et al. | |
| 8,289,265 | B2 | 10/2012 | Shen et al. | |
| 2009/0322800 | A1 * | 12/2009 | Atkins | G09G 3/3426 345/102 |

(Continued)

FOREIGN PATENT DOCUMENTS

| | | | | |
|---|---|---|---|---|
| CA | 2953335 | A1 * | 12/2015 | G02B 27/0093 |
| CA | 2953335 | C * | 1/2021 | G02B 27/0093 |

(Continued)

OTHER PUBLICATIONS

Tan K. W., et al., "FocusVR: Effective Usable VR Display Power Management," Proceedings of the ACM on Interactive, Mobile, Wearable and Ubiquitous Technologies, Article 142, Sep. 2018, 25 pages.

(Continued)

*Primary Examiner* — Kwin Xie
(74) *Attorney, Agent, or Firm* — Greenberg Traurig, LLP

(57) ABSTRACT

In particular embodiments, a computing system may receive receiving a first image frame of a sequence of image frames to be shown on a display having a plurality of backlight zones. The computing system may compute backlight unit statistics of the first image frame. The backlight unit statistics may represent grayscale levels for the plurality of backlight zones. The computing system may compute a global dimming gain for adjusting color values and backlight unit intensity of a second image frame of the sequence of image frames based on the backlight unit statistics of the first image frame. The computing system may adjust, using the global dimming gain, the color values and the backlight unit intensity of the second image frame.

17 Claims, 13 Drawing Sheets
(6 of 13 Drawing Sheet(s) Filed in Color)

(56) References Cited

U.S. PATENT DOCUMENTS

| | | | |
|---|---|---|---|
| 2011/0141154 A1 | 6/2011 | Ahn et al. | |
| 2012/0281028 A1 | 11/2012 | Orlick et al. | |
| 2013/0093802 A1 | 4/2013 | Tanaka | |
| 2013/0106923 A1* | 5/2013 | Shields | G02F 1/1347 345/102 |
| 2014/0225935 A1 | 8/2014 | Lee et al. | |
| 2014/0253609 A1 | 9/2014 | Wan et al. | |
| 2018/0247609 A1 | 8/2018 | Joshi et al. | |
| 2019/0005898 A1 | 1/2019 | Albrecht et al. | |
| 2020/0160812 A1 | 5/2020 | Tovchigrechko et al. | |
| 2020/0335047 A1 | 10/2020 | Petrovich et al. | |
| 2021/0248975 A1 | 8/2021 | Zhai | |
| 2021/0295801 A1 | 9/2021 | Chao et al. | |
| 2021/0299879 A1* | 9/2021 | Pinter | B25J 9/1697 |
| 2021/0304693 A1* | 9/2021 | Lee | G09G 3/3426 |
| 2022/0148528 A1 | 5/2022 | Ooga | |
| 2022/0165224 A1 | 5/2022 | Ooga | |
| 2022/0277699 A1 | 9/2022 | Monomoshi | |
| 2022/0277702 A1 | 9/2022 | Monomoshi et al. | |

FOREIGN PATENT DOCUMENTS

| | | | | |
|---|---|---|---|---|
| CN | 107533834 A | * | 1/2018 | G09G 3/3426 |
| EP | 3860119 A1 | | 8/2021 | |
| RU | 2633128 C2 | * | 10/2017 | G06T 5/009 |
| TW | 200837696 A | | 9/2008 | |

OTHER PUBLICATIONS

Williams J. K., "A Method for Viewing and Interacting with Medical Volumes in Virtual Reality," Graduate Theses and Dissertations, Jan. 1, 2019, 80 pages.

* cited by examiner

900

1000

SYSTEMS AND METHODS FOR PERFORMING GLOBAL DIMMING IN ARTIFICIAL REALITY SYSTEMS

TECHNICAL FIELD

This disclosure generally relates to global dimming. In particular, the disclosure relates to a technique for performing global dimming in artificial reality systems, such as virtual reality (VR) headsets.

BACKGROUND

Global dimming (GD) is a technique used in liquid crystal displays (LCD) to reduce power consumption of a backlight unit. When frame content to be displayed is not fully white, GD scales up the RGB values (e.g., LC transmittance) and scales down the backlight intensity to achieve the same final visual image at lower power cost. More specifically, GD typically scales up RGB values and dim down the BLU intensity at the same time, so it may preserve visual quality while saving power consumption.

In the conventional approaches for local and/or global dimming, red (R), green (G), and blue (B) (collectively herein referred to as RGB) information is provided by a graphics source, and a dedicated hardware (e.g., dedicated ASIC) computes a dimming or backlight matrix. The backlight matrix is then fed back to the graphics source so that the source may adjust the RGB for local and/or global dimming. An image may then be displayed based on the adjusted RGB and backlight intensity represented by the backlight matrix. The feedback loop (i.e., sending the backlight matrix back to the graphics source), however, introduces latency. Also, the RGB color adjustment consumes too much power. Performing such local and global dimming in artificial reality space is challenging.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality. Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers.

Performing local and global dimming in artificial reality space is challenging as artificial reality systems (e.g., VR headsets) do not have a dedicated hardware for computing backlight unit statistics or backlight matrix, and therefore the computation needs to be performed by the standard system's central processing unit (CPU). Additionally, low/no latency is an important factor when displaying content through these systems. Therefore, an improved solution or technique is needed, especially for VR headset displays, that can perform local dimming as well as global dimming with low latency and power requirements.

SUMMARY OF PARTICULAR EMBODIMENTS

Embodiments described herein relate to performing global dimming for artificial reality systems. Particular embodiments describe an efficient method, algorithm, and/or technique to perform global dimming in addition to local dimming. The global dimming technique discussed herein is an extension to the local dimming (LD) technique discussed in U.S. patent application Ser. No. 17/713,965, filed 5 Apr. 2022, which is hereby incorporated by reference in its entirety.

At a high level, to perform global dimming, image statistics (e.g., backlight unit (BLU) stats) of a previous frame are used to adjust RGB frame and BLU intensity for a current frame. By way of an example and without limitation, if there are three frames $T_1$, $T_2$, and $T_3$, where $T_1$ is the first frame, $T_2$ is the second frame, and $T_3$ is the third frame in a sequence of frames to be displayed, then data associated with BLU stats of the $T_1$ frame is used to adjust the RGB values and backlight intensity for displaying the $T_2$ frame, and data associated with BLU stats of the $T_2$ frame is used to adjust the RGB values and backlight intensity for displaying the $T_3$ frame. Here, the first frame $T_1$ may be displayed at its original RGB value. However, the backlight intensity may still be adjusted, particularly in the low-level grayscale regions for local dimming.

In particular embodiments, a global dimming and local dimming algorithm (also interchangeably herein referred to as GD/LD algorithm) discussed herein may calculate a global dimming gain based on image statistics (e.g., BLU stats) associated with an image frame. The calculated global dimming gain may be used to adjust RGB values and BLU intensity of a subsequent or next frame. The global dimming gain to scale up RGB values is inversely proportional to the BLU intensity. That is, the global dimming gain increases with decreasing BLU intensity. By way of an example, if the BLU stats for the current frame results in a BLU intensity of 50%, then the global dimming gain for scaling up RGB values of next frame will be 2.0. The RGB values of the next frame will be doubled (e.g., multiplied by 2), but the BLU intensity for the backlight zones is reduced by 50%. When scaling, some of the RGB values may be clipped at a certain value (e.g., 255). The amount of clipping may depend upon whether the aim is power saving or better visual quality, and the global dimming gain may be calculated accordingly.

In particular embodiments, the GD/LD algorithm may calculate a new BLU intensity for a next or subsequent frame based on max RGB or gray values associated with BLU stats of the current frame. The GD/LD algorithm may compute the BLU stats for each backlight zone to represent a grayscale or brightness level of a portion of the image within that backlight zone. In some embodiments, computing the BLU stats may include estimating a max RGB value for each backlight zone. An accumulated histogram is generated using the maximum gray values computed from the BLU stats. For a given percentile in the accumulated histogram, a threshold gray level value (e.g., 240) is taken. Once the threshold grayscale value is determined, it may be converted into a new BLU intensity for the next or subsequent frame.

In particular embodiments, the threshold may be converted into the new BLU intensity using a lookup table (LUT). For instance, the LUT may contain different BLU intensities corresponding to different threshold grayscale values. The GD/LD algorithm may use an appropriate LUT depending on whether its aim is power saving or better visual quality. For instance, a first LUT (e.g., up-concave LUT) is directed towards better visual quality as it results in a higher BLU intensity for a given threshold, which means a low global dimming gain, and therefore low chances of clipping (e.g., values being clipped at highest RGB value 255) and occurrence of artifacts due to the clipping. Whereas a second LUT (e.g., linear LUT) may be directed towards power savings as it results in a lower BLU intensity for a given threshold, which means a higher global dimming gain to scale up the RGB.

Once a BLU intensity is calculated based on BLU stats of a current frame, the GD/LD algorithm may calculate a global dimming gain for scaling RGB values and adjusting backlight intensity of subsequent frame (e.g., frame n+1). The computed global dimming gain may be passed to the next or subsequent frame for processing. In this way, global dimming may be performed for a series of frames and iterations, where, at each iteration, RGB values and backlight intensity are globally adjusted for a current frame based on previous frame's data (e.g., global dimming gain computed based on BLU stats of previous frame). Only the first frame in the series of frames is displayed according to its original RGB value. In addition to the global dimming, local dimming may also be performed at each iteration.

In some embodiments, a dramatic change in a global dimming gain (equivalently BLU intensity) from a previous global dimming gain may cause flickering. For example, if frames change dramatically from dark to bright, then it may cause flickering. To prevent it from happening, a slow adaptation technique may be implemented using a queue or other techniques. Slow adaptation technique may be implemented based on the global dimming gains computed from previous frames and stored in a queue. The actual global dimming gain for the current frame under processing may be determined by taking an average value of all previous global dimming gains in the queue. With the slow adaptation technique discussed herein, flickering may be minimized. Also, depending on the size of the queue, flickering or amount of power save may be determined.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Local dimming (LD) is a technology for liquid crystal displays (LCD) to increase contrast ratio and improve visual quality. It controls and modulates the LC transmittance with backlight brightness to properly present content with high contrast. The LD technology ensures that the lights (e.g., backlight LEDs) with which the content is displayed are dimmed or completely turned off at specific moments so that a dark scene looks correct and black colors appear true black instead of gray. U.S. patent application Ser. No. 17/713,965, filed 5 Apr. 2022, which is hereby incorporated by reference in its entirety, describes an improved local dimming pipeline (e.g., local dimming pipeline 300 shown in FIG. 3), technique, or algorithm for performing local dimming, especially for artificial-reality systems, such as AR/VR headsets. For instance, the LD algorithm (e.g., LD algorithm 321) computes backlight unit statistics (BLU stats) or backlight matrix without needing a specialized or dedicated hardware (e.g., a dedicated ASIC) as was required in a conventional or traditional pipeline for local dimming. Also, the LD algorithm eliminates the feedback loop (e.g., sending the computed backlight matrix back to a graphics rendering source for RGB adjustments) of the conventional pipeline. Due to the elimination of the feedback loop, there is considerably low or no latency when displaying content, especially through AR/VR headsets. Furthermore, since the LD algorithm eliminates RGB adjustments and need for additional hardware (e.g., dedicated ASIC) for the backlight computation, overall computational and/or power requirements are considerably reduced.

Figure 1A:
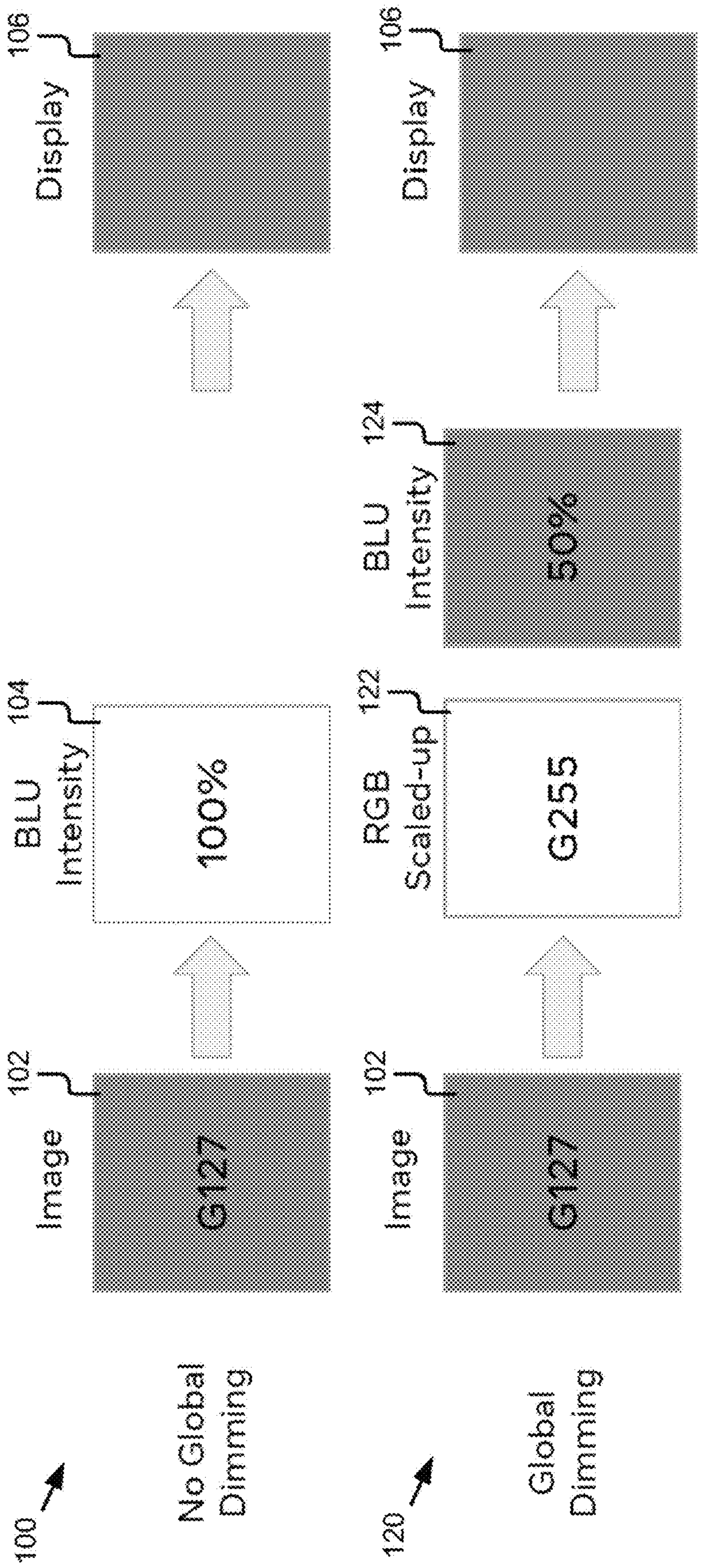
FIG. 1A illustrates an example of global dimming.

While the improved local dimming pipeline, technique, or algorithm (discussed in reference to FIG. 3) achieves improved visual contrast with low power and latency requirements for low light regions or low gray levels (e.g., black regions in a display), however, it loses the capability to modulate backlight with RGB to achieve power savings for mid-gray contents (e.g., gray regions or mid-color regions in the display). Stated differently, because the improved LD algorithm eliminates the feedback loop from a LD engine to a graphics engine for RGB adjustments, it loses the capability to adjust RGB to achieve power savings for mid-gray contents. For example, if a zone is a uniform 50% gray, because RGB values are not adjusted in the local dimming pipeline, 100% backlight may need to be used to achieve target visual performance, as shown in FIG. 1A. This may not be power efficient especially for low-powered or resource-constrained devices, such as AR/VR devices. Power savings could be achieved by scaling the RGB to full white with 50% backlight on, as shown for example in FIG. 1A. This is what global dimming does. That is, global dimming is a way to do both the RGB as well as backlight adjustments for power savings for mid-gray contents.

Global dimming (GD) (also interchangeably herein referred to as content adaptive backlight control) is a technique used in LCD to reduce the power consumption of the backlight unit. When frame content to be displayed is not fully white, GD scales up the RGB values (e.g., LC transmittance) and scales down the backlight intensity to achieve the same final visual image at lower power cost, as shown for example in FIGS. 1A and 1B. More specifically, GD typically scales up RGB values and dim down the BLU intensity at the same time, so it may preserve visual quality while saving power consumption. FIG. 1A illustrates an example of global dimming. An example comparison is shown to illustrate the difference between a scenario 100 when no global dimming is used or applied and a scenario 120 when global dimming is applied. As depicted, in the scenario 100 without global dimming, an image 102 is a uniform gray image with RGB values of 127 (e.g., R127, G127, B127). In order to output this image 102, backlight unit (BLU) intensity of 100% (indicated by reference numeral 104) is used to generate a display 106. Whereas in the scenario 120 with global dimming, RGB values of the input image 102 are scaled up to full white (e.g., R255, G255, B255), as indicated by reference numeral 122, and BLU intensity is reduced down to 50%, as indicated by reference numeral 124, to generate the same display 106.

Figure 1B:
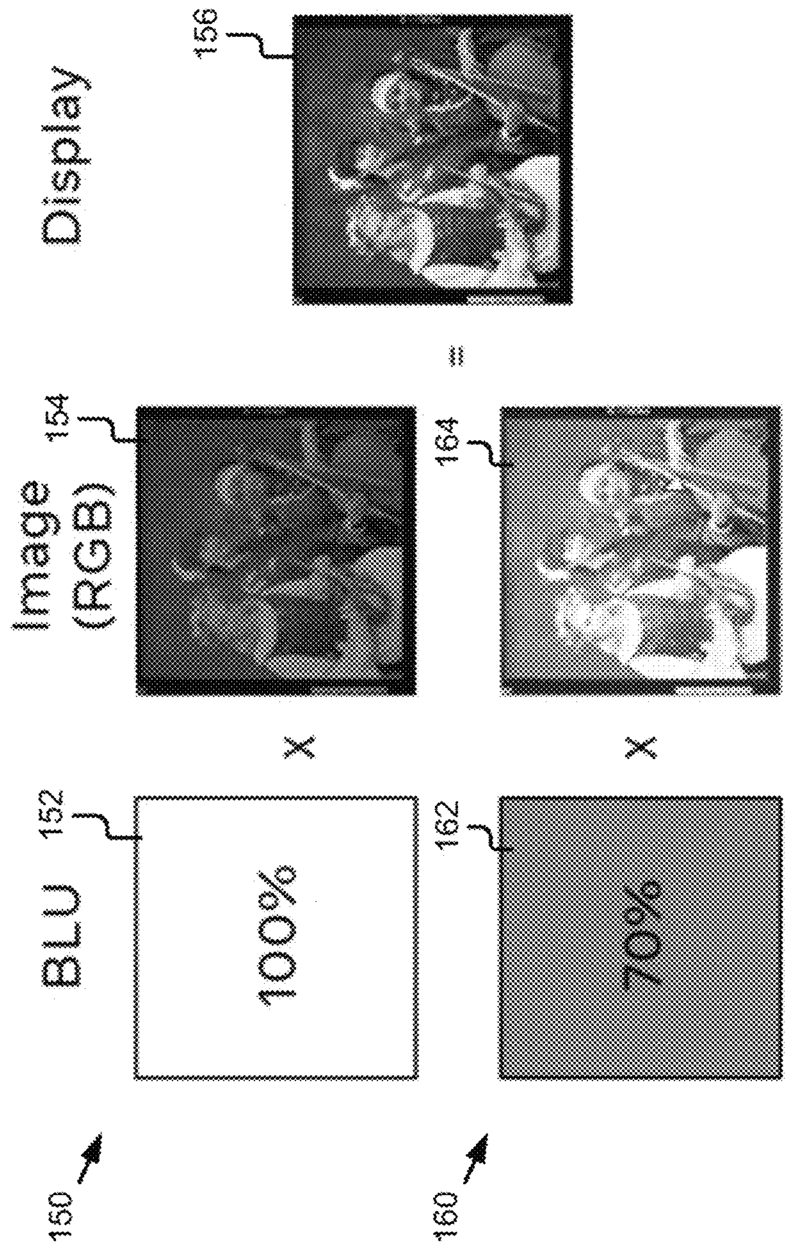
FIG. 1B illustrates another example of global dimming.

FIG. 1B illustrates another example of global dimming. Similar to FIG. 1A, an example comparison is shown to illustrate the difference between a scenario 150 when no global dimming is applied and a scenario 160 when global dimming is applied. As depicted, in the scenario 150 without global dimming, BLU intensity of 100% (indicated by reference numeral 152) for an image 154 (without RGB adjustment) is used in order to generate a display 156. Whereas in the scenario 160 with global dimming, BLU intensity is reduced to 70% (indicated by reference numeral 162) and RGB values of the image 154 are scaled up (indicated by reference numeral 164) to generate the same display 156.

Figure 2:
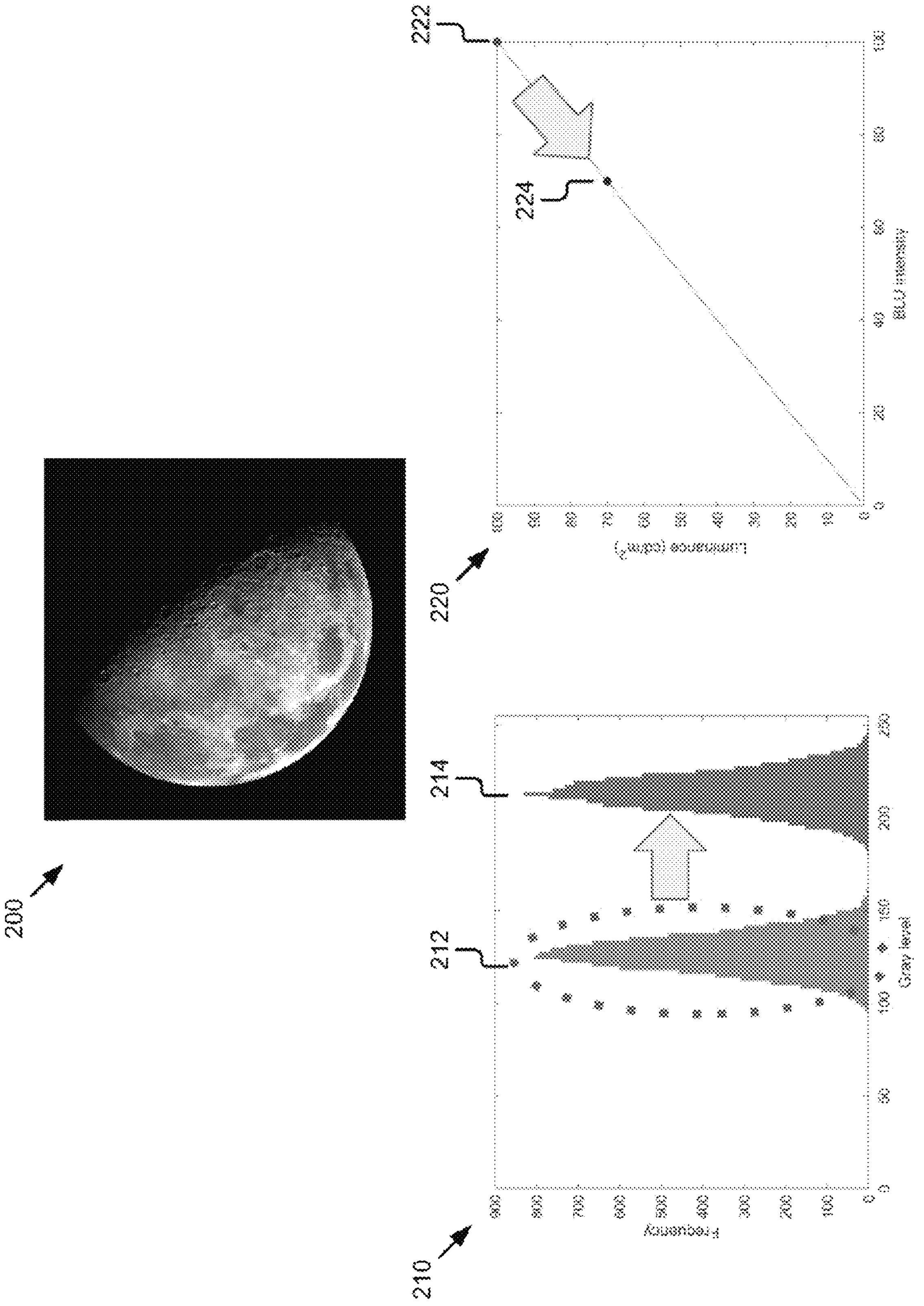
FIG. 2 illustrates example charts respectively showing RGB adjustment and BLU intensity adjustment for an image.

To further describe the concept of global dimming, FIG. 2 illustrates example charts 210 and 220 respectively showing RGB adjustment and BLU intensity adjustment for an image 200. The most important point in global dimming is how to balance between scaling up RGB values and dimming down the BLU intensity. For example, the image 200 mostly consists of mid or low gray values. This is represented by red histogram 212 in the chart 210. To generate a display based on the RGB values represented by the red histogram 212, full BLU intensity of 100% may be used, as indicated by reference numeral 222. To achieve power savings, global dimming technique discussed herein (with respect to FIG. 4), may aggressively scale up RGB values, as shown by blue histogram 214. In return, it may reduce the BLU intensity considerably, as indicated by reference numeral 224.

Particular embodiments discussed herein describes an efficient method, algorithm, and technique to perform global dimming in addition to local dimming. The technique for global dimming discussed herein is particularly suitable for artificial reality devices, such as AR/VR devices. Furthermore, the technique discussed herein is an extension to the local dimming pipeline, such as local dimming pipeline 300 shown in FIG. 3. Before describing how the method or technique for global dimming is applied to the local dimming pipeline, it is important to first understand the local dimming pipeline and various components that are associated with this pipeline.

Figure 3:
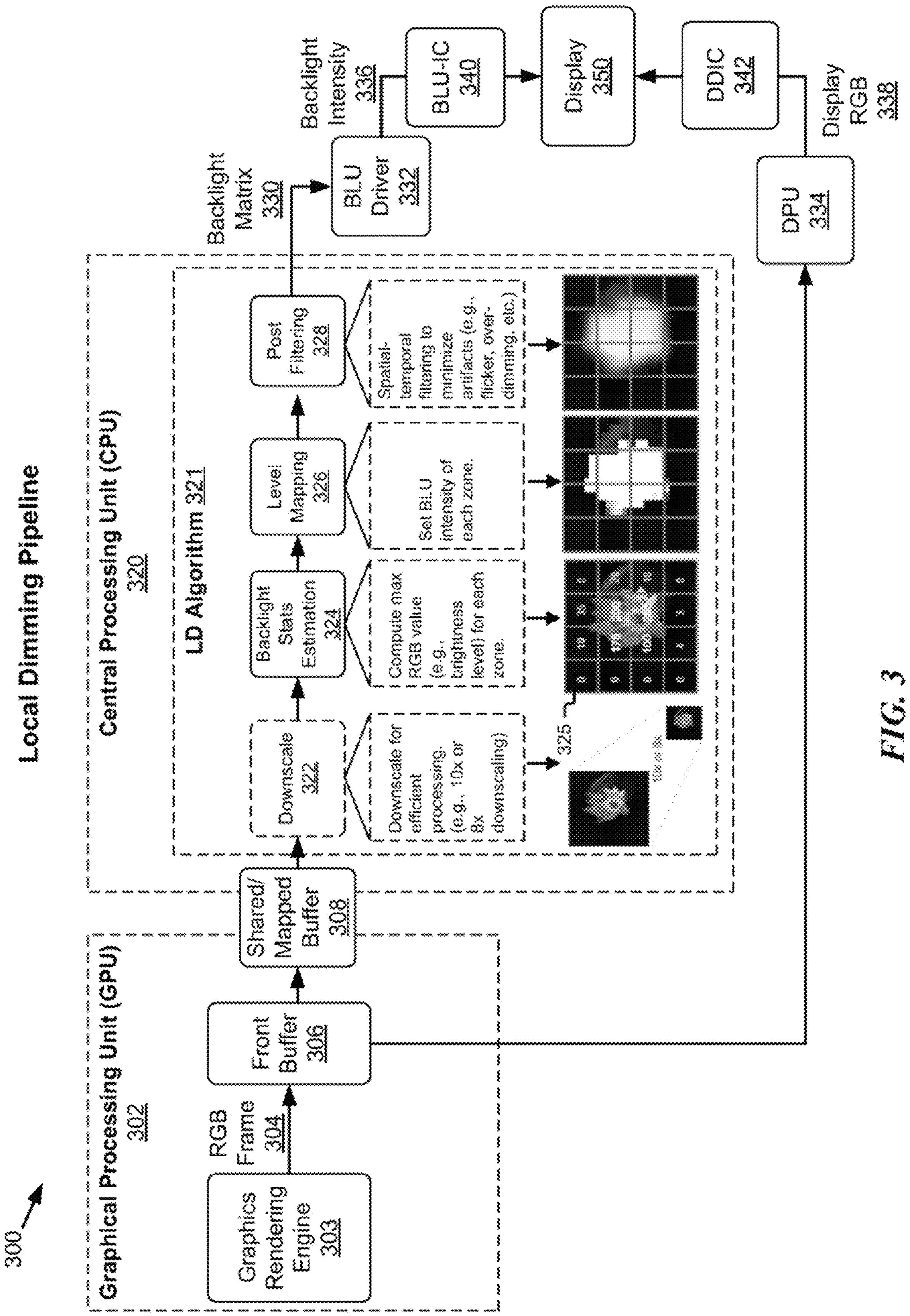
FIG. 3 illustrates an example local dimming pipeline.

FIG. 3 illustrates an example local dimming pipeline 300. The pipeline 300 illustrates various operations performed by computing components of a display system (e.g., display system 1000) at various stages for local dimming. In particular embodiments, the pipeline 300 illustrates operations performed by a graphical processing unit (GPU) 302 and a central processing unit (CPU) 320 components of the display system, such as the artificial reality system 1000 shown in FIG. 10.

Figure 7:
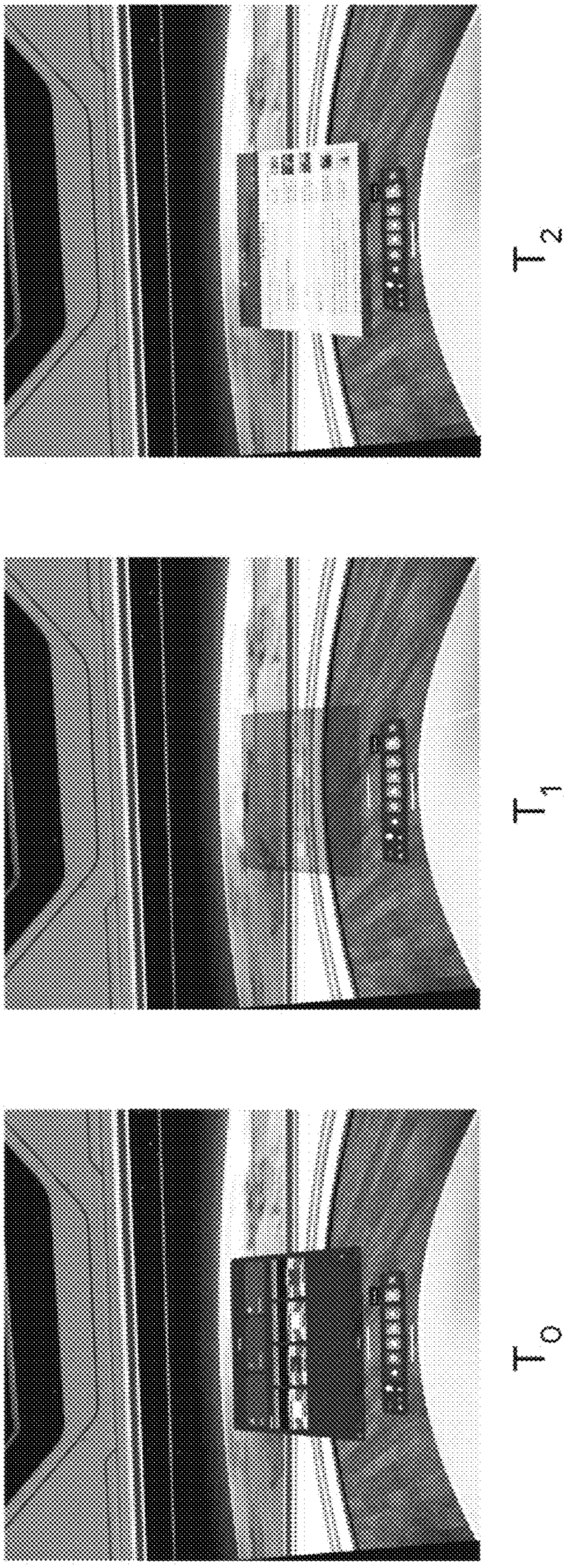
FIG. 7 illustrates example consecutive frames that may be displayed via a display system and on which global dimming may be performed.

A graphics rendering engine 303 of the GPU 302 of the display system may receive a RGB frame 304 from a particular source, such as a front-facing camera of the VR headset. Example frames that may be displayed through the VR headset are shown in FIG. 7. In some embodiments, the graphics rendering engine discussed herein may be an asynchronous time warp (ATW) compositor that receives images (e.g., RGB frames) that are to be displayed to a user. The ATW compositor may make certain adjustments (e.g., move things around, distortion correction, aberration correction, etc.) to the images before displaying. The ATW compositor may ensure that the images to be displayed are at right places and compensate for any dropped frames.

The graphics rendering engine 303 (e.g., ATW compositor) may store the RGB frame 304 in a front buffer 306. In particular embodiments, the front buffer 306 may be a dedicated memory or storage allocated to the GPU 302 for storing graphical content (e.g., images, videos, audio, frames, etc.). In order for the GPU 302 to share some portion of the graphical content with the CPU 320 for it to process, the GPU 302 may store the portion in a shared or mapped buffer 308. For instance, the GPU 302 may transfer the RGB frame 304 from the front buffer 306 to the mapped buffer 308 so that the CPU 320 may be able to process the RGB frame 304 to compute the backlight unit statistics (BLU stats) discussed herein. In some embodiments, the mapped buffer 308 may store a reduced resolution or downscaled version of the RGB frame 304. Stated differently, the mapped buffer 308 discussed herein may be a small resolution buffer that stores smaller/reduced resolution version of a RGB image for computing the BLU stats. Using the mapped buffer 308 is advantageous as it is computationally very efficient and cheap to compute the BLU stats by the CPU 320. For instance, the CPU 320 is required to perform computation for fewer pixels of a reduced RGB frame.

In particular embodiments, a local dimming (LD) algorithm 321 running on the CPU 320 may receive the RGB frame 304 from the shared or mapped buffer 308 and perform a series of steps 322, 324, 326, and 328 in sequence to compute a backlight matrix 330. In some embodiments, the first step 322 may be optional as the RGB frame 304 received from the mapped buffer 308 may already be downscaled. If it is not downscaled or further downscaling is needed, then in the first step 322, the LD algorithm 321 may generate a mipmap of the RGB frame 304. In some embodiments, generating the mipmap may include downscaling the resolution of the RGB frame 304 to a reduced resolution for efficient processing. For instance, the input resolution, especially in VR, is significantly high and since there is no dedicated/specialized hardware (e.g., dedicated ASIC) for computing the backlighting like the traditional displays, the input resolution needs to be downscaled to a smaller resolution so that the RGB frame 304 may be processed with the CPU 320. As an example and not by way of limitation, the LD algorithm 321 may use 10× downscaling or 8× (e.g., 3 level) mip downsize to downscale the RGB frame 304. In some embodiments, the value of downscaling may depend upon RGB resolution and number of backlight zones.

In the second step 324, the LD algorithm 321 may compute a zone statistic (also interchangeably referred to herein as BLU stats) for each backlight zone to represent a grayscale or brightness level of a portion of the image within that backlight zone. In other words, the LD algorithm 321 may compute how bright a particular backlight zone is based on the RGB values of pixels within that zone. Each backlight zone may encompass a subset of pixels of the RGB frame 304. As an example and not by way of limitation, a backlight zone may encompass 100 pixels out of 1000 pixels that make up the RGB frame 304. In particular embodiments, the LD algorithm 321 may compute the BLU stats for a backlight zone by first averaging values of each of the RGB channels or color components across the pixels within the backlight zone and then taking a max value of the averaged RGB. Continuing the same 100 pixels example within the backlight zone, the LD algorithm 321 may compute an average R value by taking an average of the red value across the 100 pixels, an average G value by taking an average of the green value across the 100 pixels, and an average B value by taking an average of the blue value across the 100 pixels. In this example, let's assume the average R value comes out to 10, the average G value comes out to 15, and the average B value comes out to 75, then the LD algorithm takes the max value i.e., 75 as the statistic or BLU stat for the particular backlight zone. Similarly, the LD algorithm 321 may estimate the BLU stats for other backlight zones. In particular embodiments, the LD algorithm 321 estimates these BLU stats for the backlight zones so that a particular color may be displayed with its intended brightness and only those backlight zones whose BLU stats are equal to or lower than a certain threshold may be dimmed, as discussed in further detail below in step 326. For example, if there is a bright blue in a scene (e.g., represented by the RGB frame 304), then that bright blue may be displayed as is without any adjustment.

In the third step 326, the LD algorithm 321 may perform level mapping, which including mapping the zone statistics computed in step 324, for each backlight zone, to a brightness and/or dimming value using a particular technique. The brightness and/or dimming value for a backlight zone may correspond to a BLU intensity with which to power a particular LED in that zone. For example, if the brightness values are given between 0-100 and a brightness value for a zone is given 50, then BLU intensity of 50% is used to lighten up that zone. In particular embodiments, the LD algorithm 321 may use a custom-built lookup table (LUT) to map the statistics or BLU stats to a brightness value. For instance, the lookup table may include predetermined brightness and/or dimming values corresponding to different BLU stats (e.g., max values) and the LD algorithm 321 may use this data to map each of the statistic or BLU stat associated with a backlight zone to a corresponding brightness/dimming value indicated in the lookup table. In some embodiments, the LD algorithm 321 may also perform the level mapping 326 using a machine learning (ML) technique. For instance, a trained ML model may output brightness and/or dimming values corresponding to specific statistics/BLU stats. The ML model may be trained based on ground-truth statistics and their corresponding ground-truth brightness and/or dimming values.

In some embodiments, during the level mapping operation especially in the case of local dimming, the LD algorithm 321 may use a gamma curve for low brightness zones (e.g., zones with low/dark gray levels) and saturate at certain threshold (e.g., max value less than or equal to 20). Stated differently, the LD algorithm 321 may find backlight zones whose max value is less than the certain threshold and only dim those zones to a particular brightness value using the lookup table. For instance, the backlight zones corresponding to dark or low gray levels in the RGB frame 304 may be dimmed by their corresponding brightness/dimming values in the lookup table, whereas medium and high gray levels may be left untouched or unadjusted. Since the LD algorithm 321 does not adjust the backlight of medium and/or high grayscales, the RGB does not need to be adjusted in the case of the local dimming pipeline 300. However, as stated earlier, since the RGB are not adjusted, the local dimming pipeline 300 may not be able to achieve power savings for mid-gray contents. For example, if a zone is a uniform 50% gray (e.g., RGB values of 127), since RGB is not adjusted, 100% BLU intensity may be used to lit the zone and this may not be power efficient for low-powered or resource-constrained devices, such as AR/VR devices. To achieve power savings for mid-gray content, global dimming (e.g., adjusting both the RGB as well as backlight intensity) is needed. A modified pipeline 400 for global dimming or global dimming pipeline 400 is shown and discussed in reference to at least FIG. 4.

In particular embodiment, the level mapping step 326 may output an initial backlight matrix, which may include an array of brightness and/or dimming values corresponding to a plurality of backlight zones. Simply displaying based on the backlight matrix produced after the level mapping 326 may be prone to some artifacts. These artifacts may include, for example and without limitation, backlight flickering artifacts due to head motion or moving objects in VR, over-dimming artifacts, and halo effects (e.g., light falling into darker areas surrounding an object, such as area around a bright moon that should actually be dark).

In the fourth step 328, the LD algorithm 321 may perform post filtering on the initial backlight matrix produced after the level mapping step 326 in order to correct one or more artifacts discussed above. In particular embodiments, the post filtering 328 may include the LD algorithm 321 spatially as well as temporally filtering or smoothening the brightness values in the initial backlight matrix to minimize the one or more artifacts. As an example and not by way of limitation, the LD algorithm 321 may perform the spatial filtering by using a spatial dilation and/or gaussian blur to minimize halo and over-dimming artifacts in the initial backlight matrix. The LD algorithm 321 may perform the temporal filtering by using recursive temporal averaging to remove backlight flickering artifacts occurring due to head motion or moving objects, especially in VR.

Responsive to performing the last step i.e., post filtering 328 (e.g., spatial-temporal filtering), the LD algorithm 321 generates a final backlight matrix 330. The backlight matrix 330 may indicate by what amount (e.g., percentage) each backlight zone should be lit or dimmed by a BLU driver 332. Based on the backlight matrix 330, the BLU driver 332 may output a backlight intensity 336 (e.g., brightness levels) for one or more LEDs of a display component. In some embodiments, outputting the backlight intensity 336 may include the BLU driver 332 turning on/off a subset of LEDs in the display component. In the case of local dimming, the backlight intensity 336 may include the BLU driver 332 dimming a brightness level of the subset of LEDs corresponding to low/dark gray level regions of the RGB frame 304. One or more backlight unit ICs (BLU-IC) 340 may be configured to control the backlight based on the backlight intensity 336 output by the BLU driver 332. In particular embodiments, a BLU-IC 340 may receive the backlight intensity information from the BLU driver 332 via a communication interface/bus, such as a serial peripheral interface (SPI).

In some embodiments, in addition to computing the backlight matrix 330, a display processing unit (DPU) 334 may receive the RGB frame 304 from the front buffer 306 and may perform one or more post-processing steps on the RGB frame 304 to remove one or more artifacts or further improve image quality. It should be noted that the post-processing steps performed by the DPU 334 are not related to the local dimming discussed herein and these steps may only be performed to correct some artifacts resulting from certain components (e.g., optics, lens) of the display system. As an example and without limitation, an image may be distorted due to lens distortions or chromatic aberrations resulting from light passing through optics (e.g., lens) of the VR headset and therefore, the DPU 334 may perform one or more post-processing steps on the RGB frame 304 to correct these lens distortions or effects of chromatic aberrations.

The DPU 334 may output a display RGB 338. Using the backlight intensity 336 output by the BLU driver 332 and the display RGB 338 output by the DPU 334, a display 350 may be generated. For generating the display 350, a set of integrated circuits (ICs) may be configured to generate the display 350 (e.g., output an image) based on the RGB frame output by the DPU 334 and the backlight intensity output by the BLU driver 332. For instance, one or more display driver ICs (DDIC) 342 may be configured to control display panel(s) and produce a rich and vibrant display based on the display RGB 338 output by the DPU 334. In particular embodiments, a DDIC 342 may receive the RGB information 338 from the DPU 334 via a communication layer or interface, such as C-PHY. One or more backlight unit ICs (BLU-IC) 340 may be configured to control the backlight based on the backlight intensity 336 output by the BLU driver 332. In particular embodiments, a BLU-IC 340 may receive the backlight intensity information from the BLU driver 332 via a communication interface/bus, such as a serial peripheral interface (SPI). In some embodiments, the resulting display 350 or image (i.e., RGB+backlight) may be presented on a screen of the display system. As an example and not by way of limitation, the resulting image may be presented on a VR headset's display.

The local dimming pipeline 300 discussed above may be extended to perform global dimming to achieve additional power savings, especially for mid grayscale or mid gray level content. In particular embodiments, one or more components may be added and/or adjusted in the existing local dimming pipeline 300 to perform global dimming. One such modified pipeline capable of performing global dimming in addition to local dimming is shown and discussed with respect to FIG. 4. At a high level, to perform global dimming, data associated with BLU stats of a previous frame is used to adjust RGB frame and BLU intensity for current frame. By way of an example and without limitation, if there are three frames $T_1$, $T_2$, and $T_3$, where $T_1$ is the first frame, $T_2$ is the second frame, and $T_3$ is the third frame in a sequence of frames to be displayed, then data associated with BLU stats of the $T_1$ frame is used to adjust the RGB values and backlight intensity for displaying the $T_2$ frame, and data associated with BLU stats of the $T_2$ frame is used to adjust the RGB values and backlight intensity for displaying the $T_3$ frame. Here, the first frame $T_1$ may be displayed at its original RGB value. However, the backlight intensity may still be adjusted, particularly in the low-level grayscale regions for local dimming, as discussed above for example in reference to FIG. 3. Detailed description with respect to how global dimming is performed is now discussed in reference to FIG. 4.

Figure 4:
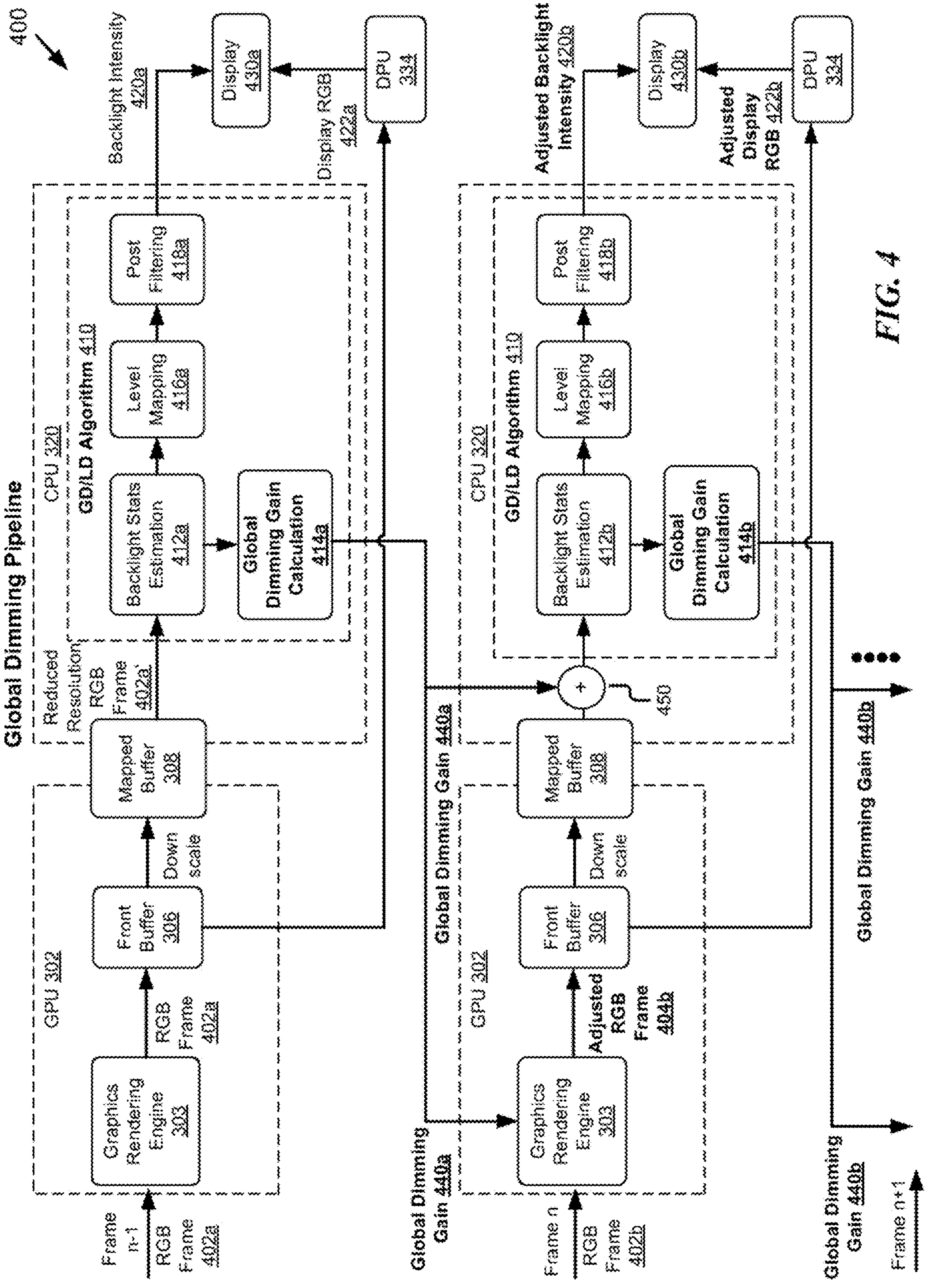
FIG. 4 illustrates a modified pipeline for global dimming or a global dimming pipeline, in accordance with particular embodiments.

FIG. 4 illustrates a modified pipeline 400 for global dimming or a global dimming pipeline 400. Although, the global dimming pipeline 400 here is described with respect to two image frames 402*a* (frame n−1) and 402*b* (frame n), it should be understood that the pipeline 400 is not by any way limited to these frames and any number of image frames are possible and within the scope of the present disclosure. Also, it should be noted that some of the reference numerals have been kept same throughout this disclosure for consistency, ease of understanding, and to refer to the same entities, components, and/or elements that have already been discussed and therefore, may not be repeated in its entirety again. However, the entities, components, and/or elements represented by these same reference numerals are not by any way limited to the scope or functionality discussed earlier and may incorporate additional scope or functionality.

As depicted, the graphics rendering engine 303 (e.g., ATW compositor) may receive a first RGB frame 402*a* (e.g., frame n−1, where n=1). The frame 402*a* may come from a particular source, such as a front-facing camera of a VR headset. As discussed elsewhere herein, the graphics rendering engine 303 may be an ATW compositor that receives images (e.g., RGB frames 402*a*, 402*b*, . . . , 402*n*) that are to be displayed to a user. The ATW compositor may make certain adjustments (e.g., move things around, distortion correction, aberration correction, etc.) to the images before displaying. The ATW compositor may ensure that the images to be displayed are at right places and compensate for any dropped frames.

Since there is no prior data available for the first RGB frame 402*a*, the first RGB frame 402*a* may be stored as is and without any adjustments in the front buffer 306. The DPU 334 may receive the RGB frame 402*a* from the front buffer 306 and may perform one or more post-processing steps discussed earlier on the RGB frame 402*a* to remove one or more artifacts or further improve image quality. The DPU 334 may output a display RGB 422*a*, which may be used along with backlight intensity 420*a* to generate a display 430*a*, as discussed in further detail below.

In order for the GPU 302 to share some portion of the graphical content with the CPU 320 for it to process, the GPU 302 may store the portion in a shared or mapped buffer 308. For instance, the GPU 302 may transfer the RGB frame 402*a* from the front buffer 306 to a reduced resolution mapped buffer 308 so that the CPU 320 may be able to efficiently process the RGB frame 402*a* to compute BLU stats. Prior to storing the RGB frame 402*a* in the mapped buffer 308, the RGB frame 402*a* may be downscaled (e.g., Blit) for efficient processing by the CPU 320. For instance, the input resolution of the RGB frame 402*a* may be downscaled (e.g., 10× downscaling or 8×) to a smaller resolution so that the RGB frame 402*a* may be processed by the CPU 320 in a way that it reduces computational costs. In some embodiments, the value of downscaling may depend upon RGB resolution and number of backlight zones. Also, to reduce the computational costs, the RGB frame 402*a* may be segmented into separated image block (e.g., 504 blocks) for processing by the CPU 320.

In particular embodiments, a global dimming (GD) and local dimming (LD) algorithm 410 (also interchangeably herein referred to as GD/LD algorithm 410) running on the CPU 320 may receive the reduced resolution RGB frame 402*a*' from the mapped buffer 308. The GD/LD algorithm 410 may perform a series of steps 412*a*, 414*a*, 416*a*, and 418*a* to compute a backlight intensity for backlight zones (e.g., LEDs) and a global dimming gain or scale factor for next frame 402*b* (e.g., frame n). In particular embodiments, the GD/LD algorithm 410 may be configured to compute brightness level and maximum gray level of each image block for local dimming and global dimming in parallel for a better computation efficiency. Also, this computation may be carried out at multiple image blocks concurrently. It should be noted that although a downscaling step (e.g., downscale step 322 of FIG. 3) is not shown in the global dimming pipeline 400, the downscaling step may also be included and performed prior to backlight stats estimation step 412*a*. For instance, if the RGB frame 402*a*' is not sufficiently downscaled or further downscaling is needed, then the GD/LD algorithm 410 may perform downscaling similar to the downscaling discussed in the downscale step 322 prior to the backlight stats estimation 412*a*.

In the backlight stats estimation step 412*a*, the GD/LD algorithm 410 may compute BLU stats for each backlight zone to represent a grayscale or brightness level of a portion of the image within that backlight zone. As discussed with respect to step 324 in FIG. 3, backlight stats estimation 412*a* may include estimating a max RGB value for each backlight zone, such as max RGB values shown in matrix 325 of FIG. 3. In some embodiments, the BLU stats may be calculated based on original RGB values associated with a RGB frame. More specifically, the BLU stats are calculated based on original RGB values of the frame that was received by the graphics rendering engine 303 and not based on adjusted RGB values (e.g., scaled up RGB values due to global dimming). Since there are no RGB adjustments made in the first frame 402*a*, the BLU stats are estimated directly based on corresponding RGB values associated with the reduced resolution RGB frame 402*a*'. However, if a RGB frame is adjusted (e.g., RGB values of frame are scaled up) as discussed in subsequent frames (e.g., frame n, n+1, etc.), then the RGB frame needs to be re-adjusted or re-scaled back to its original RGB values prior to estimating the BLU stats. An adjusted RGB frame (e.g., RGB values scaled up) may be re-adjusted back to its original RGB values based on global dimming gain or scale factor. This is further discussed in detail below with respect to backlight stats estimation step 412*b* performed for next frame 402*b* (e.g., frame n).

Responsive to estimating the BLU stats, the GD/LD algorithm 410 may perform global dimming gain calculation 414*a* and level mapping 416*a*. In some embodiments, steps 414*a* and 416*a* may be performed in parallel. In other embodiments, steps 414*a* and 416*a* may be performed in a sequential manner (i.e., one after the other). In the level mapping step 416*a*, the GD/LD algorithm 410 may map the zone statistics (e.g., BLU stats) computed in step 412*a*, for each backlight zone, to a brightness and/or dimming value using a particular technique. The brightness and/or dimming value for a backlight zone may correspond to a BLU intensity with which to power a particular LED in that zone. For example, if the grayscale values are given between 0-100 and a grayscale value for a zone is given 50, then BLU intensity of 60% is used to lighten up that zone. In particular embodiments, the BLU intensity with which the current frame 402*a* is displayed may depend upon global dimming gain and corresponding BLU intensity calculated based on previous frame's BLU stats. Since there is no previous frame before the current frame 402*a*, the GD/LD algorithm 410 may calculate the BLU intensity for the current frame 402*a* using a custom-built lookup table (LUT). For instance, the GD/LD algorithm 410 may use the LUT to map the statistics or BLU stats to a brightness value or backlight intensity. For instance, the lookup table may include predetermined brightness and/or dimming values corresponding to different BLU stats (e.g., max values) and the GD/LD algorithm 410 may use this data to map each of the statistic or BLU stat associated with a backlight zone to a corresponding brightness/dimming value indicated in the lookup table.

In some embodiments, to perform local dimming in addition to global dimming discussed herein, the GD/LD algorithm 410 may use a gamma curve for low brightness zones (e.g., zones with low/dark gray levels) and saturate at certain threshold (e.g., max value less than or equal to 20). Stated differently, the GD/LD algorithm 410 may find backlight zones whose max grayscale value (e.g., max RGB value) in the BLU stats is less than the certain threshold and only dim those zones to a particular brightness value using the lookup table. For instance, the backlight zones corresponding to dark or low gray levels may be dimmed by their corresponding brightness/dimming values in the lookup table, whereas medium and high gray levels may be left untouched.

In particular embodiment, the level mapping step 416*a* may output an initial backlight matrix, which may include an array of brightness and/or dimming values corresponding to a plurality of backlight zones. The initial backlight matrix may be representative of a BLU intensity with which to display the current frame 402*a*. Simply displaying based on the initial backlight matrix produced after the level mapping 416*a* may be prone to some artifacts (e.g., backlight flickering artifacts, over-dimming artifacts, halo effects, etc.).

In the post filtering step 418*a*, the GD/LD algorithm 410 may perform post filtering on the initial backlight matrix produced after the level mapping step 416*a* in order to correct one or more artifacts, as discussed elsewhere herein. In particular embodiments, the post filtering 418*a* may include the GD/LD algorithm 410 spatially as well as temporally filtering or smoothening the brightness values in the initial backlight matrix to minimize the one or more artifacts. As an example and not by way of limitation, the GD/LD algorithm 410 may perform the spatial filtering by using a spatial dilation and/or gaussian blur to minimize halo and over-dimming artifacts in the initial backlight matrix. The GD/LD algorithm 410 may perform the temporal filtering by using recursive temporal averaging to remove backlight flickering artifacts occurring due to head motion or moving objects, especially in VR.

Responsive to performing the post filtering 418*a* (e.g., spatial-temporal filtering), the GD/LD algorithm 410 generates a final backlight matrix. Based on the final backlight matrix, a BLU driver (e.g., BLU driver 332) may output a backlight intensity 420*a* (e.g., brightness levels) that is used along with the display RGB 422*a* to generate the display 430*a*. The resulting display 430*a* (i.e., RGB+backlight) may be presented on a screen of the display system, such as display system 1000.

In the global dimming gain calculation 414*a*, the GD/LD algorithm 410 may calculate a new BLU intensity for a subsequent/next frame (e.g., frame 402*b* or frame n) and a corresponding global dimming scale or gain factor to scale RGB values of the subsequent frame based on the BLU intensity. In some embodiments, computations for global dimming discussed herein may be done in a time frame between two consecutive frames. For example, the computations for global dimming (e.g., scaling up RGB values) may be done between frame n−1 and frame n or frame n and frame n+1. In particular embodiments, the GD/LD algorithm 410 may calculate the global dimming scale or gain factor ($Gain_{GD}$) for the subsequent frame based on following equation:

$$GainGD = \frac{1}{\text{New Blu Intensity}} \tag{1}$$

As depicted in the above equation, the global dimming gain or scale factor to scale up RGB values is inversely proportional to the new BLU intensity. That is, the global dimming gain value increases with decreasing BLU intensity. By way of an example, if the image statistics (e.g., BLU stats) for the current frame 402*a* results in a new BLU intensity of 50%, then the global dimming gain for scaling up RGB values of next frame 402*b* will be 2.0. The RGB values of the next frame 402*b* will be multiplied by 2 but the BLU intensity for the backlight zones is reduced by 50%. It should be noted that the new backlight intensity calculated for the next frame may be different from backlight intensity 420*a* that is used for displaying the current frame (e.g., frame 402*a*). For example, the backlight intensity computed for the next frame (e.g., frame 402*b*) may be 50%, whereas the backlight intensity used for the current frame (e.g., frame 402*a*) may be 70%.

In particular embodiments, the GD/LD algorithm 410 may calculate the new backlight intensity for the next or subsequent frame (e.g., frame 402*b* or frame n) based on max RGB or gray values computed in the BLU stats estimation step 412*a* for the current frame (e.g., frame 402*a* or frame n−1). An accumulated histogram is generated using the maximum gray values computed from the BLU stats estimated step 412*a*. One such histogram 212 is shown for example in FIG. 2. For a given percentile in the accumulated histogram, a threshold gray level value (e.g., 240) is taken. Stated differently, the threshold could be chosen using the accumulated histogram by setting a target percentile. For example, if the target percentile is set to 90%, then gray level corresponding to the $90^{th}$ percentile of the accumulated histogram is taken as the threshold. In particular embodiments, the target percentile for choosing the threshold may be determined in a heuristic way or what global dimming really aims at. For instance, the target percentile may be determined based on whether the goal is power saving or better visual quality. A particular lookup table (LUT) may be used for achieving the specific goal. For example, if the goal is better visual quality, then an up-concave LUT that is more conservative than a linear LUT may be used to determine the target percentile for choosing the threshold. In some embodiments, a max value of all RGB values in the BLU stats may be used to choose the threshold. This may avoid clipping (e.g., RGB values saturating at a certain value such as 255), but this also may limit the power saving amount.

Figure 5:
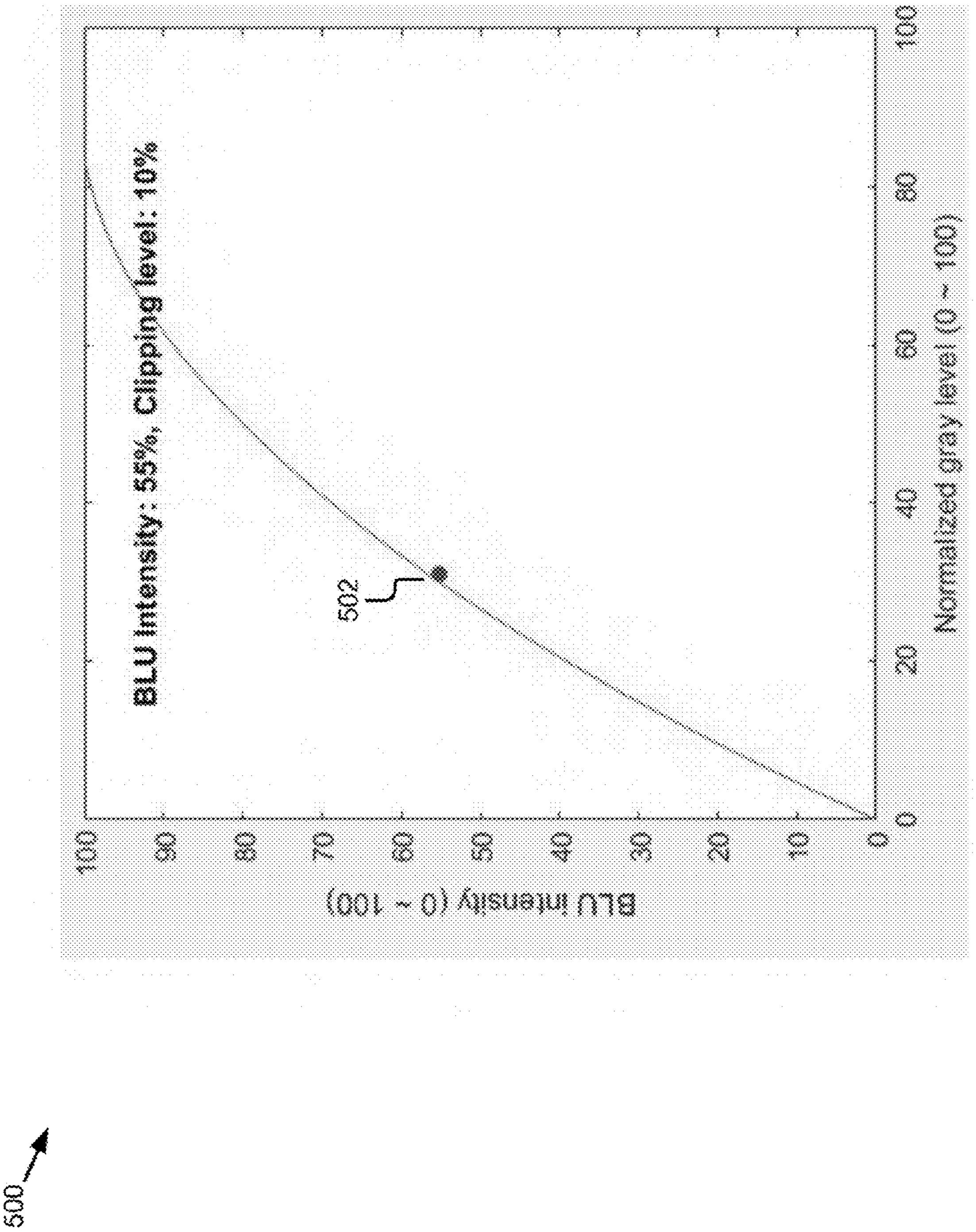
FIG. 5 illustrates an example graph depicting an example correspondence between BLU intensities and gray levels.

Once the threshold grayscale value is determined, it may be converted into a new BLU intensity for the next or subsequent frame. In some embodiments, the threshold may be converted into the new BLU intensity using a LUT. For instance, the LUT may contain different BLU intensities corresponding to different threshold grayscale values. One such example correspondence between the different BLU intensities and grayscale values is shown in FIG. 5. By way of an example and without limitation, the LUT may contain a BLU intensity of 30% for threshold grayscale value of 75, a BLU intensity of 50% for threshold grayscale value of 127, a BLU intensity of 75% for threshold gray value of 200, a BLU intensity of 100% for threshold grayscale value of 255, etc. The GD/LD algorithm 410 may use the LUT for determining a BLU intensity corresponding to the threshold it has calculated earlier. In some embodiments, different LUTs may contain varying or different BLU intensities for a same threshold grayscale value and the GD/LD algorithm 410 may use an appropriate LUT depending on whether its aim is power saving or better visual quality. For instance, a first LUT (e.g., up-concave LUT) is directed towards better visual quality as it results in a higher BLU intensity for a given threshold, which means a low global dimming gain, and therefore low chances of clipping (e.g., values being clipped at highest RGB value 255) and occurrence of artifacts due to the clipping. Whereas a second LUT (e.g., linear LUT) may be directed towards power savings as it results in a lower BLU intensity for a given threshold, which means a higher global dimming gain to scale up the RGB.

FIG. 5 illustrates an example graph 500 depicting an example correspondence between BLU intensities and gray levels. The example correspondence depicted here may be according to a particular lookup table. The BLU intensity varies from 0-100, where 0 is the least/no BLU intensity and 100 is the highest BLU intensity. Here, the BLU intensities are depicted in the Y-axis of the graph 500. The gray levels (0-255) have been normalized to range between 0-100, where 0 may represent a black image, 50 may represent a gray image, and 100 may represent a fully white image. The normalized gray levels are depicted in the X-axis of the graph 500. As depicted, the BLU intensity increases linearly with increasing normalized gray scale level. This may be the case with one of the LUTs. However, it should be noted that the BLU intensity may be different or behave differently for the same gray level according to a different LUT, as discussed above. As depicted, for a normalized gray level of 35, the BLU intensity that may be used for a frame is 55%, as indicated by reference numeral 502. Also, for the BLU intensity 55%, clipping level is set to 10%, which basically means that 10% of RGB values in an image frame may be clipped at a certain value (e.g., max RGB value of 255) when the RGB values are scaled up according to the global dimming gain that is calculated based on the 55% BLU intensity using equation (1).

Generally, the amount of clipping depends on the target percentile that is chosen for the threshold grayscale. Also, the amount of clipping may generally increase with decreasing BLU intensity. More specifically, if the BLU intensity is low, then using equation (1), the global dimming gain by which the RGB values are scaled up will be high and therefore, there are high chances of more RGB values being clipped. As an example, if the BLU intensity is 50%, then using equation (1) above, the global dimming gain will be 2, which is used to scale up the RGB values of a frame by a factor of 2 (i.e., multiplying RGB values by 2). If the original RGB values are already in higher range (e.g., 100-200), then a lot of values when scaled up will be clipped at a certain value (e.g., 255). Although, the reduced backlight intensity and corresponding large amount of clipping may achieve power savings, but the large amount of clipping may also lead to visual artifacts. Whereas, if the backlight intensity is high (e.g., 90%), then the RGB values are only scaled up by a small amount (e.g., scaled up by 1.11 based on 90% BLU intensity). This may prevent clipping and achieve better visual quality, but on the downside may not be very power efficient as 90% backlight intensity is used to generate a display. Therefore, the new BLU intensity and corresponding global dimming gain may be computed based on whether the aim is power saving or better visual quality, and target percentile and LUT for the computation may be chosen accordingly.

Figure 6:
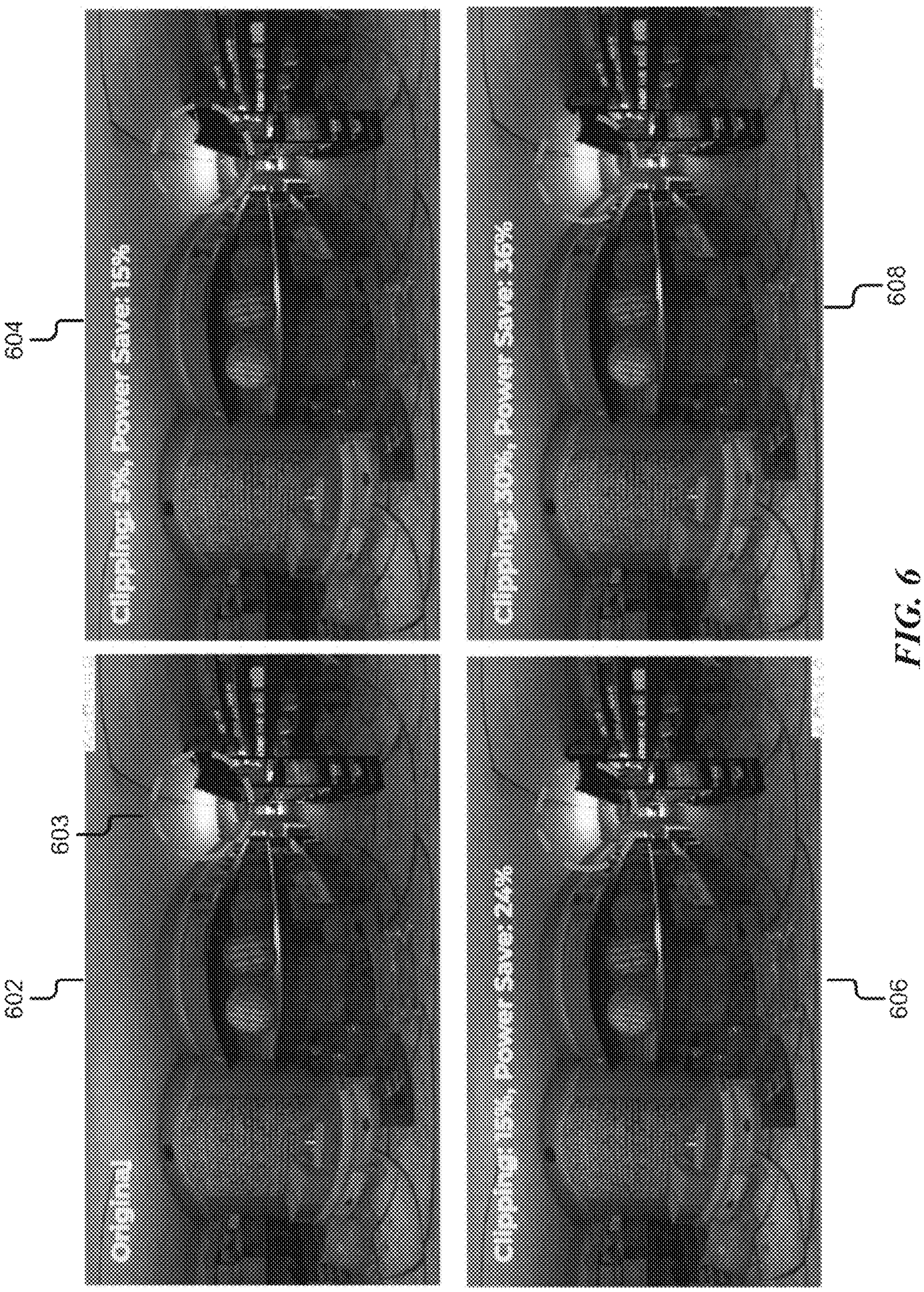
FIG. 6 illustrates example images depicting global dimming with different clipping levels.

FIG. 6 illustrates example images 602, 604, 606, and 608 depicting global dimming with different clipping levels. Specifically, image 602 is an original image i.e., image with original RGB values and without any readjustments. The image 602 includes an area 603 with a group of high gray levels. These high gray levels may be clipped or converged to a certain value (e.g., 255) depending on a certain threshold. Image 604 is a readjusted image with 5% clipping and power saving of 15%. Image 606 is a readjusted image with 15% clipping and power saving of 24%. Image 608 is a readjusted image with 30% clipping and power saving of 36%. As can be observed from these images 604, 606, and 608, power savings increases with the amount of clipping. However, it should be noted that while increased power savings may be achieved with increased clipping, visual quality may suffer due to the increased clipping. As such, the amount of clipping may depend on whether one wants more power save or better visual quality.

Referring back to global dimming gain calculation step 414*a*, once a BLU intensity for the next frame is calculated as discussed above, a global dimming gain 440*a* may be accordingly calculated using the equation (1) above. The global dimming gain 440*a* may then be passed to the next or subsequent frame 402*b*. As depicted in FIG. 4, the global dimming gain 440*a* may be passed to the GPU 302 for RGB adjustment as well as to the CPU 320 for backlight intensity adjustment. Using the global dimming gain 440*a*, global dimming may be performed for the next frame i.e., frame n or RGB frame 402*b*. The global dimming is now discussed below with respect to the frame 402*b*.

As depicted, the graphics rendering engine 303 (e.g., ATW compositor) may receive a second RGB frame 402*b*. The second RGB frame 402*b* may come after the first RGB frame 402*a*. The graphics rendering engine 303 may also receive the global dimming gain 440*a*, which has been calculated based on BLU stats of the previous frame 402*a*. Using the global dimming gain 440*a*, the graphics rendering engine 303 may adjust the RGB values of the second frame 402*b* to generate an adjusted RGB frame 404*b*. In particular embodiments, adjusting the RGB values may include scaling up the RGB values of the second frame 402*b*. By way of an example and without limitation, if the second RGB frame 402*b* is a uniform gray image (e.g., RGB average value of 127) and the global dimming gain is 2, then all the RGB values of the frame 402*b* are globally scaled up by multiplying the RGB values by 2 (e.g., RGB values scaled up to 254). Stated differently, if the global dimming scalar or gain is 2, then all the RGB values are doubled in the linear RGB domain. It should be noted that the global dimming gain for the first frame (e.g., 402*a* or frame n−1) is 1, meaning that RGB values of the first frame do not change. Also, it should be noted that ATW compositor and scaling up RGB are computationally expensive. As such, they are incorporated into a single process.

As discussed earlier, some of the RGB values may be clipped at a certain value when scaled up. The amount of clipping may depend on whether one wants more power save or better visual quality. Different LUTs may be utilized depending on how much clipping (e.g., power save) is desired. For instance, a up-concave LUT is more conservative and may prevent clipping than a linear LUT because for a given normalized gray level, the up-concave LUT may result in a higher BLU intensity (e.g., meaning a low global dimming gain).

The graphics rendering engine 303 may store adjusted GB frame 404*b* (e.g., frame with scaled up RGB values) in the front buffer 306. The DPU 334 may receive the adjusted RGB frame 404*b* from the front buffer 306 and may perform one or more post-processing steps, as discussed elsewhere herein. The DPU 334 may output an adjusted display RGB 422*b*, which may be used along with adjusted backlight intensity 420*b* to generate a display 430*b*.

To compute the adjusted backlight intensity 420*b* and a new backlight intensity for subsequent frame (e.g., frame n+1), the GPU 302 may transfer the adjusted RGB frame 404*a* from the front buffer 306 to the mapped buffer 308 so that the CPU 320 may be able to efficiently process the adjusted RGB frame 404*a* to compute BLU stats for current frame. As discussed elsewhere herein, prior to storing the adjusted RGB frame 404*b* in the mapped buffer 308, the adjusted RGB frame 404*b* may be downscaled for efficient processing by the CPU 320.

In particular embodiments, the GD/LD algorithm 410 running on the CPU 320 may receive a reduced resolution version of the adjusted RGB frame 404*b* from the mapped buffer 308. The CPU 320 may also receive the global dimming gain 440*a* (computed based on previous frame 402*a*), as indicated by reference numeral 450. In some embodiments, the CPU 320 and/or the GD/LD algorithm 410 may use the global dimming gain 440*a* for temporal filtering to minimize certain artifacts (e.g., flickering artifacts). For example, the current frame (e.g., frame n) may be considerably different from previous frame (e.g., frame n−1) and this would cause flickering. Also, since the current frame is downscaled from its original resolution to a smaller resolution, some information may be missing that would again cause some flickering. Therefore, to reduce these flickering artifacts, the GD/LD algorithm 410 may perform temporal filtering based on the global dimming gain 440*a* calculated based on previous frame stats or data.

In the backlight stats estimation step 412*b*, the GD/LD algorithm 410 may compute BLU stats for each backlight zone to represent a grayscale or brightness level of a portion of the image within that backlight zone. As discussed elsewhere herein, the backlight stats estimation 412*b* may include estimating a max RGB value for each backlight zone. The BLU stats may be calculated based on original RGB values associated with the RGB frame 402*b*. More specifically, the BLU stats are calculated based on original RGB values of the frame 402*b* that was received by the graphics rendering engine 303 and not based on adjusted RGB values associated with the adjusted RGB frame 404*b* received from the mapped buffer 308. To obtain the original RGB values, the GD/LD algorithm 410 upon receiving the adjusted RGB frame 404*b* may re-scale the RGB values associated with the adjusted RGB frame 404*b* by dividing the RGB values of the adjusted RGB frame 404*b* by the global dimming gain 440*a*. As an example, if the global dimming gain is 2, then the RGB values are divided by 2 to obtain the original RGB values for the adjusted RGB frame 404*b*.

Responsive to estimating the BLU stats, the GD/LD algorithm 410 may perform global dimming gain calculation 414*b* and level mapping 416*b*, as discussed elsewhere herein. In particular embodiments, the global dimming gain 440*a* may be incorporated into the level mapping 416*b*. From the global dimming gain 440*a*, the BLU intensity may be determined using equation (1) discussed above. The actual BLU intensity for the current frame (e.g., frame n) may be calculated as the inverse of the global dimming gain 440*a*. This BLU intensity may be incorporated into the level mapping 416*b* to ensure that brightness and/or dimming values that are calculated in the level mapping 416*b* are adjusted according to this BLU intensity. For example, if the BLU intensity associated with the global dimming gain 440*a* is 50%, then brightness values or backlight intensity that is computed in the level mapping 416*b* for the current frame (e.g., 402*b* or frame n) is globally reduced by 50% (e.g., all brightness values are reduced by 50%).

The level mapping step 416*b* may output an initial backlight matrix, which may include an array of brightness and/or dimming values corresponding to a plurality of backlight zones. The initial backlight matrix may be representative of a BLU intensity with which to display the current frame 402*b*. Simply displaying based on the initial backlight matrix produced after the level mapping 416*b* may be prone to some artifacts (e.g., backlight flickering artifacts, over-dimming artifacts, halo effects, etc.). In the post filtering step 418*b*, the GD/LD algorithm 410 may perform post filtering (e.g., spatial-temporal filtering) on the initial backlight matrix produced after the level mapping step 416*a* in order to correct one or more artifacts, as discussed elsewhere herein. Responsive to performing the post filtering 418*b*, the GD/LD algorithm 410 generates a final backlight matrix. Based on the final backlight matrix, a BLU driver (e.g., BLU driver 332) may output an adjusted backlight intensity 420*b* (e.g., backlight intensity globally adjusted based on global dimming gain received from previous frame) that is used along with the adjusted display RGB 422*b* to generate the display 430*b*.

In the global dimming gain calculation 414*a*, the GD/LD algorithm 410 may calculate a new BLU intensity for a subsequent/next frame (e.g., frame n+1) and a corresponding global dimming scale or gain 440*b* to scale RGB values of the subsequent frame based on the new BLU intensity. The GD/LD algorithm may compute the new BLU intensity based on selecting a threshold for a target percentile and then converting the threshold to the BLU intensity using a specific LUT. More specifically, an accumulated histogram is generated using the maximum gray values computed from the backlight stats estimation step 412*b*. For a given percentile, threshold may be taken. This threshold may be converted into a new BLU intensity using a LUT, as shown for example in FIG. 5. From this new BLU intensity, the global dimming gain 440*b* for scaling RGB values and adjusting backlight intensity of subsequent frame (e.g., frame n+1) may be calculated. The global dimming gain 440*b* may be calculated using equation (1) discussed above. The computed global dimming gain 440*b* is then passed to the next or subsequent frame for processing the next frame. In this way, global dimming may be performed for a series of frames and iterations, where, at each iteration, RGB values and backlight intensity are globally adjusted for a current frame based on previous frame's data (e.g., global dimming gain computed based on BLU stats of previous frame). Only the first frame in the series of frames is displayed according to its original RGB value. In addition to the global dimming, local dimming (discussed with respect to FIG. 3) may also be performed at each iteration.

In some embodiments, a dramatic change in a global dimming gain (equivalently BLU intensity) from a previous global dimming gain may cause flickering. For example, if frames change dramatically from dark to bright, then it may cause flickering. One such example scenario is depicted in FIG. 7. FIG. 7 illustrates three example consecutive frames $T_0$, $T_1$, and $T_2$ that may be displayed via a display system, such as display system 1000. Global dimming discussed herein may be performed on these frames. As shown in FIG. 7, the frames $T_0$, $T_1$, and $T_2$ change dramatically from dark (as shown in frame $T_0$) to bright (as shown in frame $T_2$). This may cause flickering. To prevent it from happening, a slow adaptation technique may be implemented using a queue or other techniques. Slow adaptation technique may be implemented based on the global dimming gains computed from previous frames and stored in a queue, as shown for example in FIG. 8. So, the actual global dimming gain for the current frame under processing may be determined by taking an average value of all previous global dimming gains in the queue.

Figure 8:
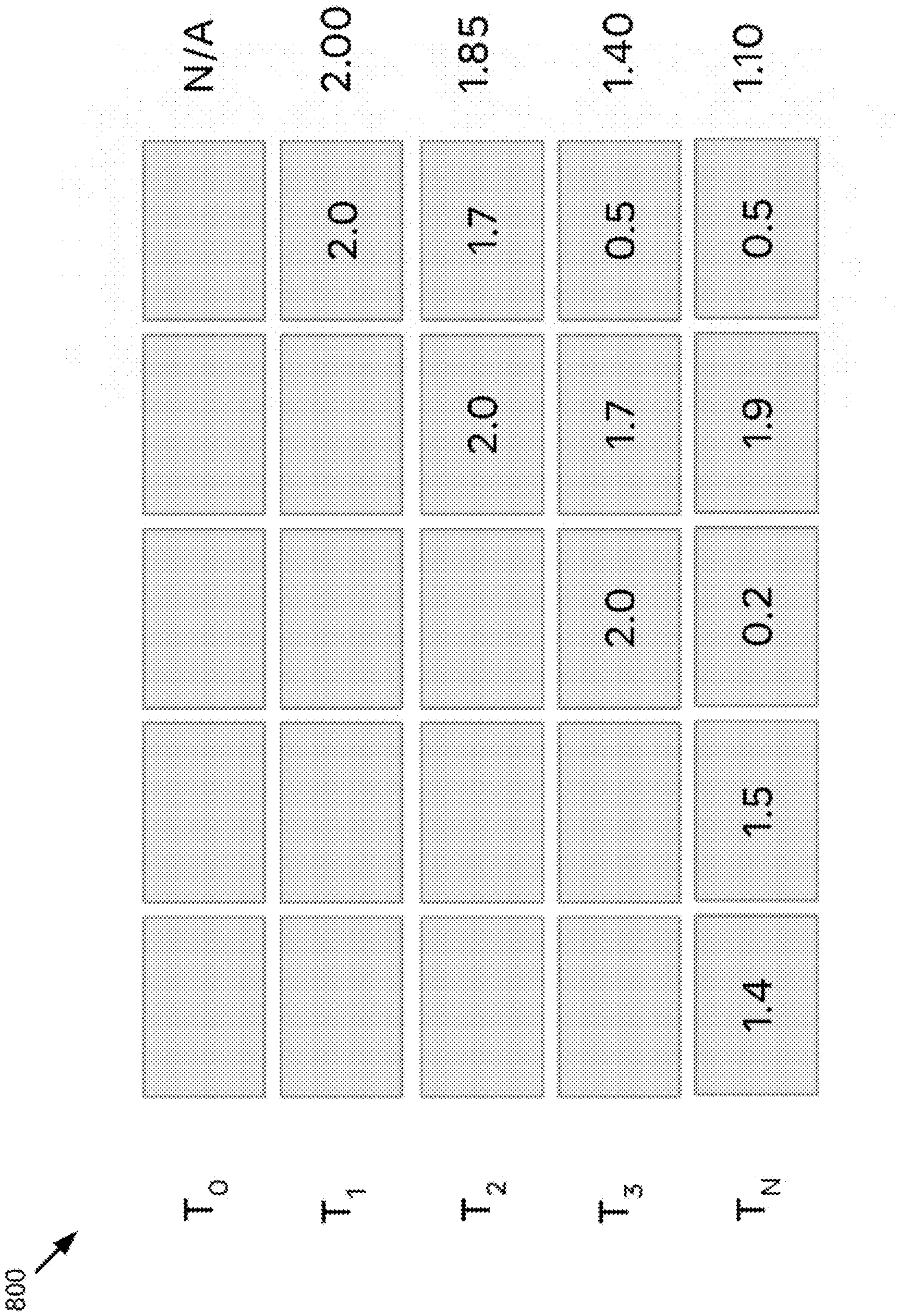
FIG. 8 illustrates an example slow adaptation technique to minimize artifacts associated with a plurality of frames.

FIG. 8 illustrates an example slow adaptation technique to minimize artifacts associated with a plurality of frames. Specifically, FIG. 8 illustrates an example queue 800 to store global dimming gains associated with the plurality of frames $T_0$, $T_1$, $T_2$, $T_3$, and $T_N$. Using the queue 800, slow adaptation technique may be implemented to minimize artifacts, such as flickering artifacts. As illustrated, there is no global dimming gain stored in the queue 800 for the first frame since there is no previous frame data. Based on the first frame $T_0$ data (e.g., BLU stats), the GD/LD algorithm 410 may calculate a global dimming gain of 2.00 to adjust the RGB values and backlight intensity of second frame $T_1$. The computed global dimming gain is stored in the queue 800. For the next frame $T_2$, the GD/LD algorithm 410 may calculate a global dimming gain of 1.7 based on the previous frame $T_1$ data. Instead of using the global dimming gain of 1.7, an average of current global dimming gain of 1.7 and previous global dimming gain(s) (e.g., 2) may instead be taken to determine a global dimming gain of 1.85 to use for the current frame i.e., $T_2$. For the next frame $T_3$, the GD/LD algorithm 410 may calculate a global dimming gain of 0.5 based on the previous frame $T_2$ data. Since there is significant difference between the current global dimming gain and previous gain, an average of current global dimming gain of 0.5 and previous global dimming gains (e.g., 2.0 and 1.7) may be taken to determine a global dimming gain of 1.40 to use for the current frame i.e., $T_3$. Similarly, an average global dimming gain of 1.1 may be computed for frame $T_N$. With the slow adaptation technique discussed herein, flickering may be minimized. Also, depending on the size of the queue (e.g., queue 800), flickering or amount of power save may be determined.

In some embodiments, the size of a queue that is used for slow adaptation technique may vary. For instance, VR devices (e.g., display system 1000) may support multiple frames rates, for example, 60 Hz, 72 Hz, 90 Hz, 120 Hz, etc. As the frame rate increases, the severity of flickering artifacts may also increase. Stated differently, higher the frame rate, higher are the changes of severe flickering artifacts. Therefore, depending on the frame rate of the device (e.g., display system 1000), the queue size (or the speed of slow adaptation) may be varied. For instance, if the frame rate increases, the queue size may also increase to minimize the flickering. But, at low frame rates, the queue size may decrease to achieve more power savings.

Figure 9:
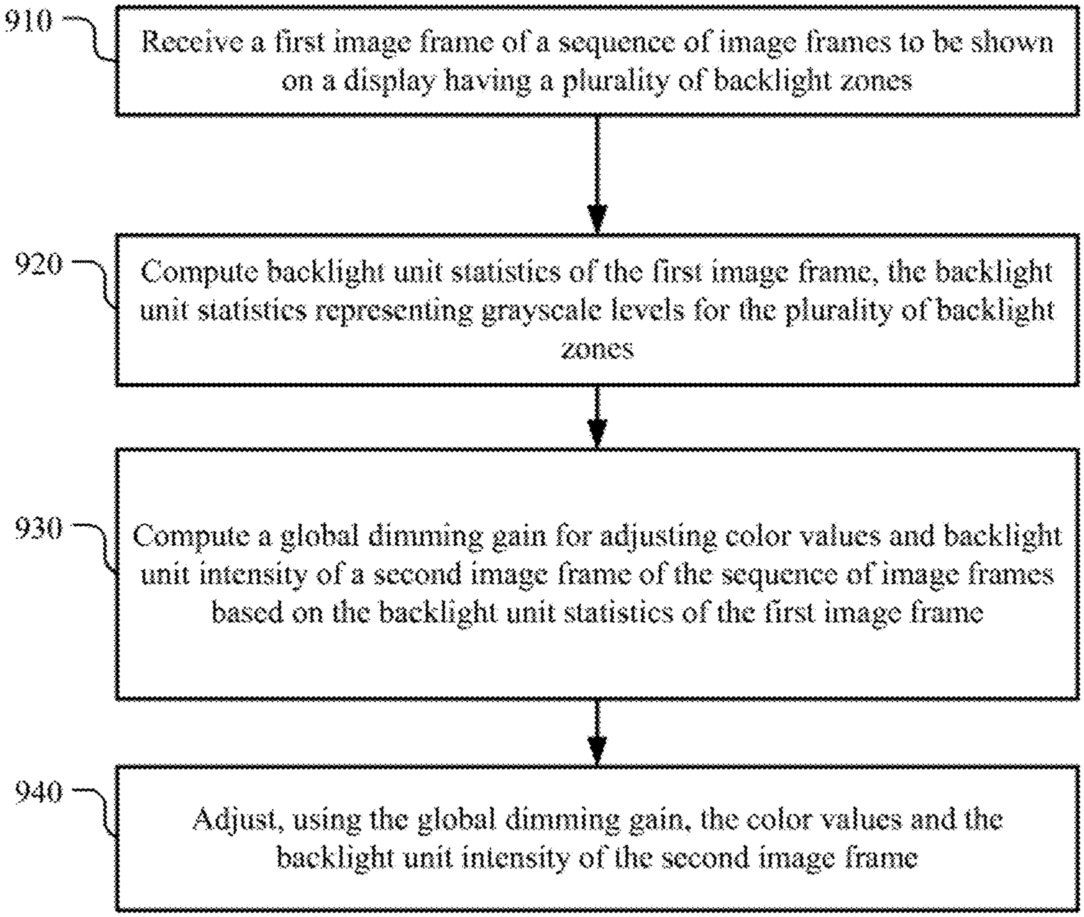
FIG. 9 illustrates an example method for global dimming, in accordance with particular embodiments.

FIG. 9 illustrates an example method 900 for global dimming, in accordance with particular embodiments. The method may begin at step 910, where a computing system may receive a first image frame of a sequence of image frames to be shown on a display having a plurality of backlight zones. The sequence of image frames may be consecutive image frames, as shown, for example, frames $T_0$, $T_1$, and $T_2$ in FIG. 7. Each of the sequence of image frames may include a plurality of color components, such as RGB color components or channels. The display may be associated with an artificial reality system, such as the artificial reality system 1000 shown in FIG. 10. The artificial reality system may be a virtual reality headset.

At step 920, the computing system may compute backlight unit statistics (i.e., BLU stats) of the first image frame. The backlight unit statistics may represent grayscale levels (e.g., RGB values) for the plurality of backlight zones. In particular embodiments, computing the backlight unit statistics may include computing, for each color component of a plurality of color components (e.g., RGB color components) in the first image frame, an average grayscale value of the color component across a plurality of pixels within each backlight zone of the plurality of backlight zones and then determining, for each color backlight zone, a maximum grayscale value among average values of the plurality of color components, as discussed for example in the backlight stats estimation step 412*a* in FIG. 4.

At step 930, the computing system may compute a global dimming gain for adjusting color values and backlight unit intensity of a second image frame of the sequence of image frames based on the backlight unit statistics of the first image frame. In particular embodiments, computing the global dimming gain may include generating an accumulated histogram based on maximum grayscale values determined for the plurality of backlight zones during computation of the backlight unit statistics; determining, for a target percentile in the accumulated histogram, a threshold grayscale value; converting the threshold grayscale value to a particular backlight unit intensity using a lookup table; and computing the global dimming gain using the particular backlight unit intensity, as discussed for example in the global dimming gain calculation step 414*a* in FIG. 4. In particular embodiments, the global dimming gain is inversely proportional to the particular backlight unit intensity, as shown in the equation (1) discussed herein.

At step 940, the computing system may adjust, using the global dimming gain, the color values and the backlight unit intensity of the second image frame. In particular embodiments, adjusting, using the global dimming gain, the color values and the backlight unit intensity of the second image frame may include scaling up RGB color values of the second image frame and reducing the backlight unit intensity of the plurality of backlight zones for displaying the second image frame, as discussed for example with respect to RGB frame 402*b* in FIG. 4.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for global dimming, including the particular steps of the method of FIG. 9, this disclosure contemplates any suitable method for global dimming, including any suitable steps, which may include a subset of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
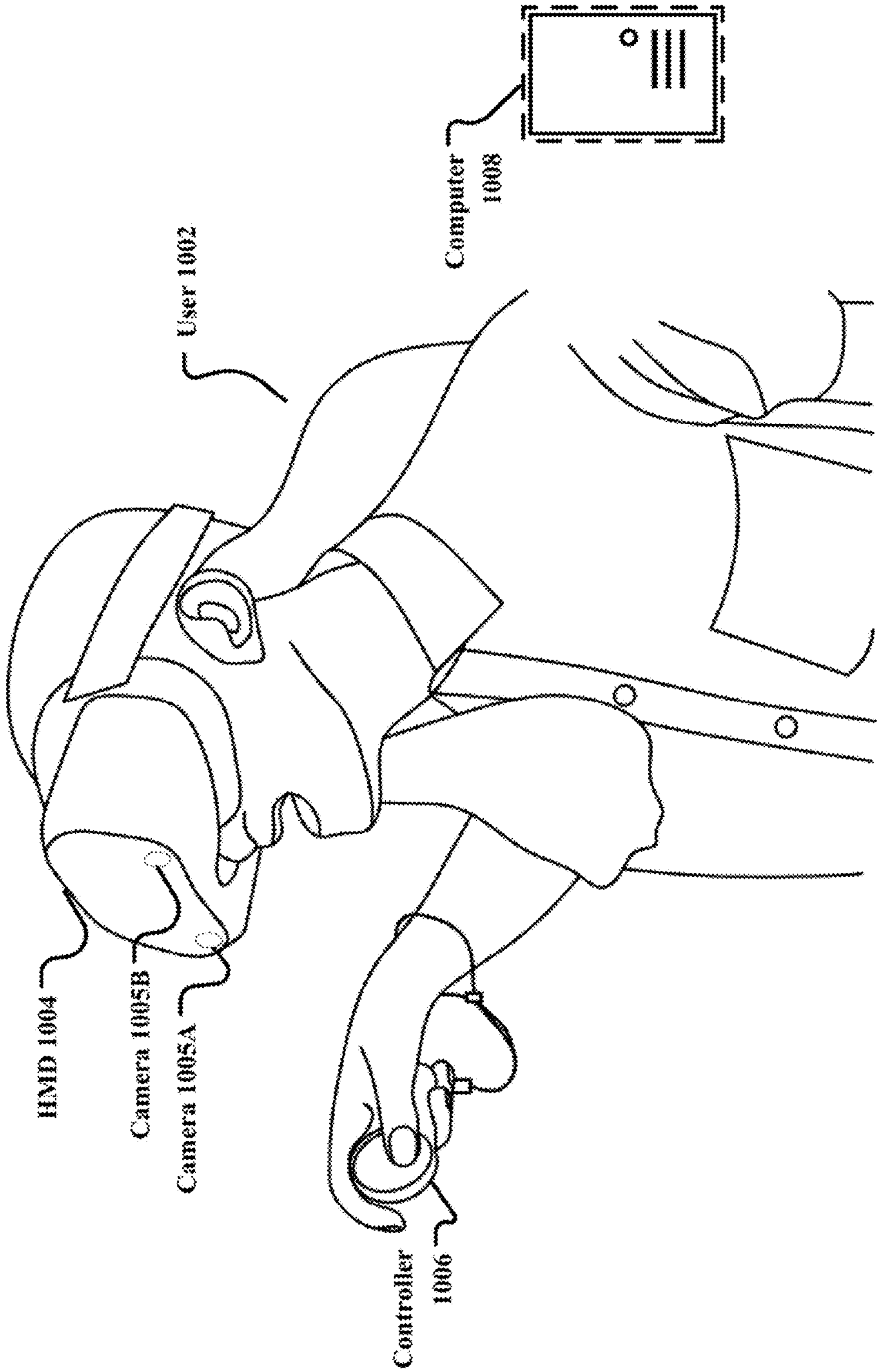
FIG. 10 illustrates an example of a display system.

FIG. 10 illustrates an example of a display system, in particular, an artificial reality system 1000 worn by a user 1002. The display system or the artificial reality system 1000 may be used to implement some of the embodiments/examples disclosed herein. The artificial reality system 1000 may be configured to operate as a virtual reality display, an augmented reality display, and/or a mixed reality display. In particular embodiments, the artificial reality system 1000 may comprise a head-mounted device ("HMD") 1004, a controller 1006, and a computing system 1008. The HMD 1004 may be worn over the user's eyes and provide visual content (e.g., VR or AR content) to the user 1002 through internal displays (not shown). The HMD 1004 may have two separate internal displays, one for each eye of the user 1002. As illustrated in FIG. 10, the HMD 1004 may completely cover the user's field of view. By being the exclusive provider of visual information to the user 1002, the HMD 1004 achieves the goal of providing an immersive artificial-reality experience.

The HMD 1004 may have external-facing cameras, such as the two forward-facing cameras 1005A and 1005B shown in FIG. 10. While only two forward-facing cameras 1005A-B are shown, the HMD 1004 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video).

The 3D representation may be generated based on depth measurements of physical objects observed by the cameras 1005A-B. Depth may be measured in a variety of ways. In particular embodiments, depth may be computed based on stereo images. For example, the two forward-facing cameras 1005A-B may share an overlapping field of view and be configured to capture images simultaneously. As a result, the same physical object may be captured by both cameras 1005A-B at the same time. For example, a particular feature of an object may appear at one pixel $p_A$ in the image captured by camera 1005A, and the same feature may appear at another pixel $p_B$ in the image captured by camera 1005B. As long as the depth measurement system knows that the two pixels correspond to the same feature, it could use triangulation techniques to compute the depth of the observed feature. For example, based on the camera 1005A's position within a 3D space and the pixel location of $p_A$ relative to the camera 1005A's field of view, a line could be projected from the camera 1005A and through the pixel $p_A$. A similar line could be projected from the other camera 1005B and through the pixel $p_B$. Since both pixels are supposed to correspond to the same physical feature, the two lines should intersect. The two intersecting lines and an imaginary line drawn between the two cameras 1005A and 1005B form a triangle, which could be used to compute the distance of the observed feature from either camera 1005A or 1005B or a point in space where the observed feature is located.

In particular embodiments, the pose (e.g., position and orientation) of the HMD 1004 within the environment may be needed. For example, in order to render the appropriate display for the user 1002 while he is moving about in a virtual environment, the system 1000 would need to determine his position and orientation at any moment. Based on the pose of the HMD, the system 1000 may further determine the viewpoint of either of the cameras 1005A and 1005B or either of the user's eyes. In particular embodiments, the HMD 1004 may be equipped with inertial-measurement units ("IMU"). The data generated by the IMU, along with the stereo imagery captured by the external-facing cameras 1005A-B, allow the system 1000 to compute the pose of the HMD 1004 using, for example, SLAM (simultaneous localization and mapping) or other suitable techniques.

In particular embodiments, the artificial reality system 1000 may further have one or more controllers 1006 that enable the user 1002 to provide inputs. The controller 1006 may communicate with the HMD 1004 or a separate computing unit 1008 via a wireless or wired connection. The controller 1006 may have any number of buttons or other mechanical input mechanisms. In addition, the controller 1006 may have an IMU so that the position of the controller 1006 may be tracked. The controller 1006 may further be tracked based on predetermined patterns on the controller. For example, the controller 1006 may have several infrared LEDs or other known observable features that collectively form a predetermined pattern. Using a sensor or camera, the system 1000 may be able to capture an image of the predetermined pattern on the controller. Based on the observed orientation of those patterns, the system may compute the controller's position and orientation relative to the sensor or camera.

The artificial reality system 1000 may further include a computer unit 1008. The computer unit may be a stand-alone unit that is physically separate from the HMD 1004 or it may be integrated with the HMD 1004. In embodiments where the computer 1008 is a separate unit, it may be communicatively coupled to the HMD 1004 via a wireless or wired link. The computer 1008 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 1000 depends on the capabilities of its computer unit 1008.

Figure 11:
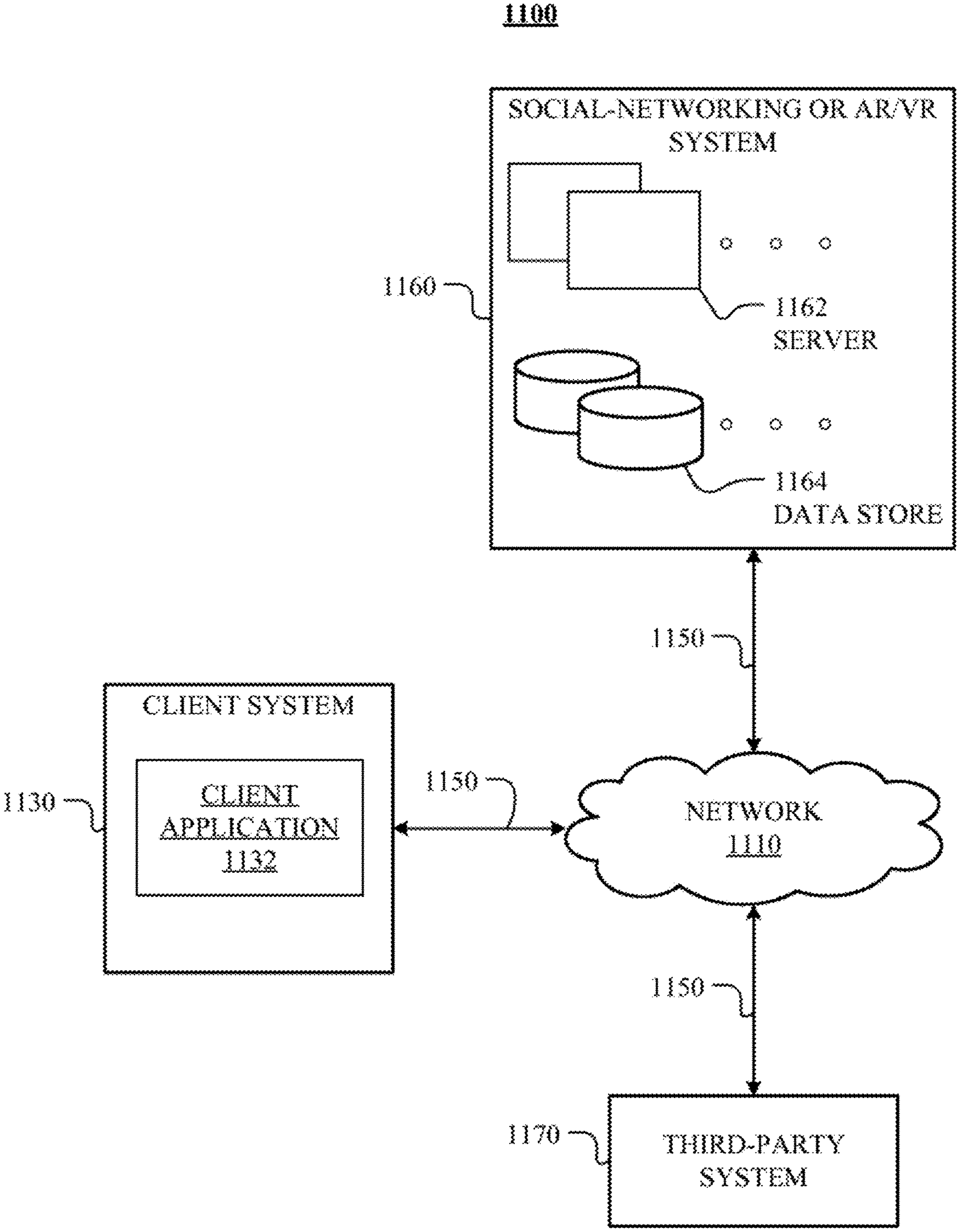
FIG. 11 illustrates an example network environment associated with a social-networking system, an augmented reality, or a virtual-reality system.

FIG. 11 illustrates an example network environment 1100 associated with an augmented reality (AR)/virtual reality (VR) system or a social-networking system. Network environment 1100 includes a client system 1130, a VR (or AR) or social-networking system 1160, and a third-party system 1170 connected to each other by a network 1110. Although FIG. 11 illustrates a particular arrangement of client system 1130, VR or social-networking system 1160, third-party system 1170, and network 1110, this disclosure contemplates any suitable arrangement of client system 1130, AR/VR or social-networking system 1160, third-party system 1170, and network 1110. As an example and not by way of limitation, two or more of client system 1130, AR/VR or social-networking system 1160, and third-party system 1170 may be connected to each other directly, bypassing network 1110. As another example, two or more of client system 1130, AR/VR or social-networking system 1160, and third-party system 1170 may be physically or logically co-located with each other in whole or in part. Moreover, although FIG. 11 illustrates a particular number of client systems 1130, AR/VR or social-networking systems 1160, third-party systems 1170, and networks 1110, this disclosure contemplates any suitable number of client systems 1130, AR/VR or social-networking systems 1160, third-party systems 1170, and networks 1110. As an example and not by way of limitation, network environment 1100 may include multiple client system 1130, AR/VR or social-networking systems 1160, third-party systems 1170, and networks 1110.

This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 may connect client system 1130, AR/VR or social-networking system system 1160, and third-party system 1170 to communication network 1110 or to each other. This disclosure contemplates any suitable links 1150. In particular embodiments, one or more links 1150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1150, or a combination of two or more such links 1150. Links 1150 need not necessarily be the same throughout network environment 1100. One or more first links 1150 may differ in one or more respects from one or more second links 1150.

In particular embodiments, client system 1130 may be an electronic device including hardware, software, or embedded logic components or a combination of two or more such components and capable of carrying out the appropriate functionalities implemented or supported by client system 1130. As an example and not by way of limitation, a client system 1130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1130. A client system 1130 may enable a network user at client system 1130 to access network 1110. A client system 1130 may enable its user to communicate with other users at other client systems 1130.

In particular embodiments, client system 1130 may include a client application 1132 operable to provide various computing functionalities, services, and/or resources, and to send data to and receive data from the other entities of the network 1110, such as the AR/VR or social-networking system 1160 and/or the third-party system 1170. For example, the client application 1132 may be a social-networking application, an artificial-intelligence related application, a virtual reality application, an augmented reality application, an artificial reality or a mixed reality application, a camera application, a messaging application for messaging with users of a messaging network/system, a gaming application, an internet searching application, etc.

In particular embodiments, the client application 1132 may be storable in a memory and executable by a processor of the client system 1130 to render user interfaces, receive user input, send data to and receive data from one or more of the AR/VR or social-networking system 1160 and the third-party system 1170. The client application 1132 may generate and present user interfaces to a user via a display of the client system 1130.

In particular embodiments, AR/VR or social-networking system 1160 may be a network-addressable computing system that can host an online Virtual Reality environment, an augmented reality environment, or social network. AR/VR or social-networking system 1160 may generate, store, receive, and send social-networking data, such as, for example, user-profile data, concept-profile data, social-graph information, or other suitable data related to the online social network. Social-networking or AR/VR system 1160 may be accessed by the other components of network environment 1100 either directly or via network 1110. As an example and not by way of limitation, client system 1130 may access social-networking or AR/VR system 1160 using a web browser, or a native application associated with social-networking or AR/VR system 1160 (e.g., a mobile social-networking application, a messaging application, another suitable application, or any combination thereof) either directly or via network 1110. In particular embodiments, social-networking or AR/VR system 1160 may include one or more servers 1162. Each server 1162 may be a unitary server or a distributed server spanning multiple computers or multiple datacenters. Servers 1162 may be of various types, such as, for example and without limitation, a mapping server, web server, news server, mail server, message server, advertising server, file server, application server, exchange server, database server, proxy server, another server suitable for performing functions or processes described herein, or any combination thereof. In particular embodiments, each server 1162 may include hardware, software, or embedded logic components or a combination of two or more such components for carrying out the appropriate functionalities implemented or supported by server 1162. In particular embodiments, social-networking or AR/VR system 1160 may include one or more data stores 1164. Data stores 1164 may be used to store various types of information. In particular embodiments, the information stored in data stores 1164 may be organized according to specific data structures. In particular embodiments, each data store 1164 may be a relational, columnar, correlation, or other suitable database. Although this disclosure describes or illustrates particular types of databases, this disclosure contemplates any suitable types of databases. Particular embodiments may provide interfaces that enable a client system 1130, a social-networking or AR/VR system 1160, or a third-party system 1170 to manage, retrieve, modify, add, or delete, the information stored in data store 1164.

In particular embodiments, social-networking or AR/VR system 1160 may store one or more social graphs in one or more data stores 1164. In particular embodiments, a social graph may include multiple nodes—which may include multiple user nodes (each corresponding to a particular user) or multiple concept nodes (each corresponding to a particular concept)—and multiple edges connecting the nodes. Social-networking or AR/VR system 1160 may provide users of the online social network the ability to communicate and interact with other users. In particular embodiments, users may join the online social network via social-networking or AR/VR system 1160 and then add connections (e.g., relationships) to a number of other users of social-networking or AR/VR system 1160 to whom they want to be connected. Herein, the term "friend" may refer to any other user of social-networking or AR/VR system 1160 with whom a user has formed a connection, association, or relationship via social-networking or AR/VR system 1160.

In particular embodiments, social-networking or AR/VR system 1160 may provide users with the ability to take actions on various types of items or objects, supported by social-networking or AR/VR system 1160. As an example and not by way of limitation, the items and objects may include groups or social networks to which users of social-networking or AR/VR system 1160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or AR/VR system 1160 or by an external system of third-party system 1170, which is separate from social-networking or AR/VR system 1160 and coupled to social-networking or AR/VR system 1160 via a network 1110.

In particular embodiments, social-networking or AR/VR system 1160 may be capable of linking a variety of entities. As an example and not by way of limitation, social-networking or AR/VR system 1160 may enable users to interact with each other as well as receive content from third-party systems 1170 or other entities, or to allow users to interact with these entities through an application programming interfaces (API) or other communication channels.

In particular embodiments, a third-party system 1170 may include one or more types of servers, one or more data stores, one or more interfaces, including but not limited to APIs, one or more web services, one or more content sources, one or more networks, or any other suitable components, e.g., that servers may communicate with. A third-party system 1170 may be operated by a different entity from an entity operating social-networking or AR/VR system 1160. In particular embodiments, however, social-networking or AR/VR system 1160 and third-party systems 1170 may operate in conjunction with each other to provide social-networking services to users of social-networking or AR/VR system 1160 or third-party systems 1170. In this sense, social-networking or AR/VR system 1160 may provide a platform, or backbone, which other systems, such as third-party systems 1170, may use to provide social-networking services and functionality to users across the Internet.

In particular embodiments, a third-party system 1170 may include a third-party content object provider. A third-party content object provider may include one or more sources of content objects, which may be communicated to a client system 1130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or AR/VR system 1160 also includes user-generated content objects, which may enhance a user's interactions with social-networking or AR/VR system 1160. User-generated content may include anything a user can add, upload, send, or "post" to social-networking or AR/VR system 1160. As an example and not by way of limitation, a user communicates posts to social-networking or AR/VR system 1160 from a client system 1130. Posts may include data such as status updates or other textual data, location information, photos, videos, links, music or other similar data or media. Content may also be added to social-networking or AR/VR system 1160 by a third-party through a "communication channel," such as a newsfeed or stream.

In particular embodiments, social-networking or AR/VR system 1160 may include a variety of servers, sub-systems, programs, modules, logs, and data stores. In particular embodiments, social-networking or AR/VR system 1160 may include one or more of the following: a web server, a mapping server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or AR/VR system 1160 may also include suitable components such as network interfaces, security mechanisms, load balancers, failover servers, management-and-network-operations consoles, other suitable components, or any suitable combination thereof. In particular embodiments, social-networking or AR/VR system 1160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or AR/VR system 1160 to one or more client systems 1130 or one or more third-party system 1170 via network 1110. The web server may include a mail server or other messaging functionality for receiving and routing messages between social-networking or AR/VR system 1160 and one or more client systems 1130. An API-request server may allow a third-party system 1170 to access information from social-networking or AR/VR system 1160 by calling one or more APIs. An action logger may be used to receive communications from a web server about a user's actions on or off social-networking or AR/VR system 1160. In conjunction with the action log, a third-party-content-object log may be maintained of user exposures to third-party-content objects. A notification controller may provide information regarding content objects to a client system 1130. Information may be pushed to a client system 1130 as notifications, or information may be pulled from client system 1130 responsive to a request received from client system 1130. Authorization servers may be used to enforce one or more privacy settings of the users of social-networking or AR/VR system 1160. A privacy setting of a user determines how particular information associated with a user can be shared. The authorization server may allow users to opt in to or opt out of having their actions logged by social-networking or AR/VR system 1160 or shared with other systems (e.g., third-party system 1170), such as, for example, by setting appropriate privacy settings. Third-party-content-object stores may be used to store content objects received from third parties, such as a third-party system 1170. Location stores may be used for storing location information received from client systems 1130 associated with users. Advertisement-pricing modules may combine social information, the current time, location information, or other suitable information to provide relevant advertisements, in the form of notifications, to a user.

Figure 12:
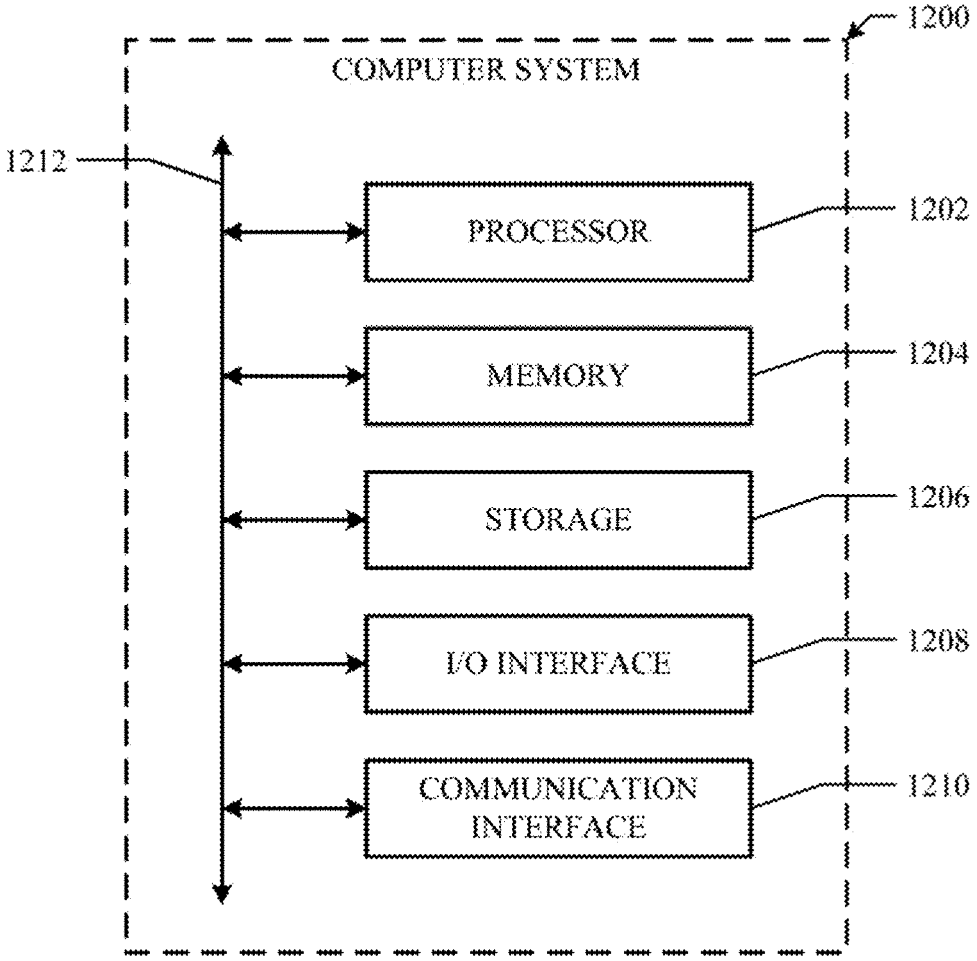
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, implemented by a computing system, comprising:
- receiving a first image frame of a sequence of image frames to be shown on a display having a plurality of backlight zones;
- computing backlight unit statistics of the first image frame, the backlight unit statistics representing grayscale levels for the plurality of backlight zones;
- computing a global dimming gain for adjusting color values and backlight unit intensity of subsequent image frames of the sequence of image frames based on the backlight unit statistics of the first image frame;
- storing the global dimming gain in a queue with at least one previously computed global dimming gain;
- determining an average global dimming gain in the queue; and
- adjusting, using the average global dimming gain, the color values and the backlight unit intensity of a second image frame in the sequence of image frames, comprising:
  - scaling up the color values of red, green, and blue (RGB) color components of the second image frame based on the average global dimming gain; and
  - reducing the backlight unit intensity of the plurality of backlight zones for displaying the second image frame based on the average global dimming gain.

2. The method of claim 1, wherein computing the backlight unit statistics of the first image frame comprises:
- computing, for each color component of a plurality of color components in the first image frame, an average grayscale value of the color component across a plurality of pixels within each backlight zone of the plurality of backlight zones; and
- determining, for each color backlight zone, a maximum grayscale value among average values of the plurality of color components.

3. The method of claim 1, wherein computing the global dimming gain comprises:

generating an accumulated histogram based on maximum grayscale values determined for the plurality of backlight zones during computation of the backlight unit statistics;

determining, for a target percentile in the accumulated histogram, a threshold grayscale value;

converting the threshold grayscale value to a particular backlight unit intensity using a lookup table; and computing the global dimming gain using the particular backlight unit intensity.

4. The method of claim 3, wherein the global dimming gain is inversely proportional to the particular backlight unit intensity.

5. The method of claim 1, wherein the display is associated with an artificial reality system.

6. The method of claim 5, wherein the artificial reality system is a virtual reality headset.

7. One or more computer-readable non-transitory storage media embodying software that is operable when executed to:

receive a first image frame of a sequence of image frames to be shown on a display having a plurality of backlight zones;

compute backlight unit statistics of the first image frame, the backlight unit statistics representing grayscale levels for the plurality of backlight zones;

compute a global dimming gain for adjusting color values and backlight unit intensity of a subsequent image frames of the sequence of image frames based on the backlight unit statistics of the first image frame;

store the global dimming gain in a queue with at least one previously computed global dimming gain;

determine an average global dimming gain in the queue; and adjust, using the average global dimming gain, the color values and the backlight unit intensity of a second image frame in the sequence of image frames, wherein to adjust, using the average global dimming gain, the color values and the backlight unit intensity of the second image frame, the software is further operable when executed to:

scale up the color values of red, green, and blue (RGB) color components of the second image frame based on the average global dimming gain; and reduce the backlight unit intensity of the plurality of backlight zones for displaying the second image frame based on the average global dimming gain.

8. The media of claim 7, wherein to compute the backlight unit statistics of the first image frame, the software is further operable when executed to:

compute, for each color component of a plurality of color components in the first image frame, an average grayscale value of the color component across a plurality of pixels within each backlight zone of the plurality of backlight zones; and determine, for each color backlight zone, a maximum grayscale value among average values of the plurality of color components.

9. The media of claim 7, wherein to compute the global dimming gain, the software is further operable when executed to:

generate an accumulated histogram based on maximum grayscale values determined for the plurality of backlight zones during computation of the backlight unit statistics;

determine, for a target percentile in the accumulated histogram, a threshold grayscale value;

convert the threshold grayscale value to a particular backlight unit intensity using a lookup table; and compute the global dimming gain using the particular backlight unit intensity.

10. The media of claim 9, wherein the global dimming gain is inversely proportional to the particular backlight unit intensity.

11. The media of claim 7, wherein the display is associated with an artificial reality system.

12. The media of claim 11, wherein the artificial reality system is a virtual reality headset.

13. A system comprising:

one or more processors; and one or more computer-readable non-transitory storage media coupled to one or more of the processors and comprising instructions operable when executed by one or more of the processors to cause the system to:

receive a first image frame of a sequence of image frames to be shown on a display having a plurality of backlight zones;

compute backlight unit statistics of the first image frame, the backlight unit statistics representing grayscale levels for the plurality of backlight zones;

compute a global dimming gain for adjusting color values and backlight unit intensity of subsequent image frames of the sequence of image frames based on the backlight unit statistics of the first image frame;

store the global dimming gain in a queue with at least one previously computed global dimming gain;

determine an average global dimming gain in the queue; and adjust, using the average global dimming gain, the color values and the backlight unit intensity of a second image in the sequence of image frames, wherein to adjust, using the average global dimming gain, the color values and the backlight unit intensity of the second image frame, the one or more processors are further operable when executing the instructions to cause the system to:

scale up the color values of red, green, and blue (RGB) color components of the second image frame based on the average global dimming gain; and reduce the backlight unit intensity of the plurality of backlight zones for displaying the second image frame based on the average global dimming gain.

14. The system of claim 13, wherein to compute the backlight unit statistics of the first image frame, the one or more processors are further operable when executing the instructions to cause the system to:

compute, for each color component of a plurality of color components in the first image frame, an average grayscale value of the color component across a plurality of pixels within each backlight zone of the plurality of backlight zones; and determine, for each color backlight zone, a maximum grayscale value among average values of the plurality of color components.

15. The system of claim 13, wherein to compute the global dimming gain, the one or more processors are further operable when executing the instructions to cause the system to:

generate an accumulated histogram based on maximum grayscale values determined for the plurality of backlight zones during computation of the backlight unit statistics;

determine, for a target percentile in the accumulated histogram, a threshold grayscale value;

convert the threshold grayscale value to a particular backlight unit intensity using a lookup table; and compute the global dimming gain using the particular backlight unit intensity.

16. The system of claim 15, wherein the global dimming gain is inversely proportional to the particular backlight unit intensity.

17. The system of claim 13, wherein the display is associated with an artificial reality system.

* * * * *